(12) United States Patent
Spitz et al.

(10) Patent No.: US 7,277,835 B2
(45) Date of Patent: Oct. 2, 2007

(54) BOUNDARY REPRESENTATION PER FEATURE METHODS AND SYSTEMS

(75) Inventors: Steven Spitz, Jerusalem (IL); Ari Rappoport, Jerusalem (IL)

(73) Assignee: Proficiency, Ltd., Jerusalem (IL)

( * ) Notice: Subject to any disclaimer, the term of this patent is extended or adjusted under 35 U.S.C. 154(b) by 638 days.

(21) Appl. No.: 10/363,183

(22) PCT Filed: Aug. 30, 2001

(86) PCT No.: PCT/US01/27218

§ 371 (c)(1),
(2), (4) Date: Mar. 5, 2003

(87) PCT Pub. No.: WO02/21450

PCT Pub. Date: Mar. 14, 2002

(65) Prior Publication Data

US 2003/0176994 A1    Sep. 18, 2003

(51) Int. Cl.
G06G 7/56 (2006.01)
G06F 17/10 (2006.01)
G06F 17/50 (2006.01)
G09G 1/14 (2006.01)
G06T 15/00 (2006.01)
G06T 17/20 (2006.01)

(52) U.S. Cl. ............... 703/5; 345/20; 345/419; 345/423; 703/14; 703/2; 716/1; 716/20

(58) Field of Classification Search .......... 703/6, 703/5; 345/420
See application file for complete search history.

(56) References Cited

U.S. PATENT DOCUMENTS 5,646,862 A    7/1997    Jolliffe et al.

(Continued)

FOREIGN PATENT DOCUMENTS

EP    0355167 A1    2/1990

(Continued)

OTHER PUBLICATIONS

Requicha, A.A.G. "Boolean Operations in Solid Modeling: Boundary Evaluation and Merging Algorithms". Proceedings of the IEEE, vol. 73, Jan. 198. pp. 30-44.*

(Continued)

*Primary Examiner*—Kamini Shah
*Assistant Examiner*—Shambhavi Patel
(74) *Attorney, Agent, or Firm*—Fish & Richardson P.C.

(57) ABSTRACT

Computer implemented methods and systems for CAD data exchange, and in particular for creating boundary representations ("breps") on a feature-by-feature basis are disclosed. According to an embodiment of the techniques described herein, a parameterized feature from a parametric based design system is exported from a source CAD system (404). Iterative steps and complimentary extraction techniques are employed by one or more processors (452, 456) to create an importable design model of the parameterized feature (433), which is imported into a target CAD system (408). While the techniques can include API (436), pattern matching (440), and user emulation (444) techniques, they include a brep per feature (450) technique. By exporting the brep on a per feature (453) basis from the source CAD system (404), the design intent of a CAD designer can be preserved on importation into the target CAD system (408). In particular, where a parametric representation (433) of the feature fails to import into the target system (408), an unparameterized representation (453) of the feature can be substituted.

22 Claims, 21 Drawing Sheets

U.S. PATENT DOCUMENTS

| | | | |
|---|---|---|---|
| 5,717,905 | A | 2/1998 | Iwamoto et al. |
| 5,781,720 | A | 7/1998 | Parker et al. |
| 5,815,415 | A | 9/1998 | Bentley et al. |
| 5,870,588 | A | 2/1999 | Rompaey et al. |
| 5,945,995 | A | 8/1999 | Higuchi et al. |
| 6,828,963 | B1 * | 12/2004 | Rappoport .................. 345/419 |

FOREIGN PATENT DOCUMENTS

| | | |
|---|---|---|
| WO | WO95/29440 | 11/1995 |
| WO | WO99/44107 | 9/1999 |
| WO | WO 02/37406 A1 | 5/2002 |

OTHER PUBLICATIONS

James Foley. "Computer Graphics: Principles and Practice", Second Edition. Addison-Wesley Publishing Company, 1996. pp. 542-561.*

Shapiro et al. "What is a Parametric Family of Solids?" ACM 1995.*

Bettig et al."Derivation of a Standard Set of Geometric Constraints for Parametric Modeling and Data Exchange". Computer Aided Design 2000.*

Bhandarkar et al. "Migrating from IGES to STEP: One to One Translation of IGES Drawing to STEP Drafting Data" Computers in Industry 41 (2000) pp. 261-277.*

Bhandarkar et al. "STEP-Based Feature Extraction from STEP Geometry for Agile Manufacturing" Computers in Industry 41 (2000) pp. 3-24.*

Sakurai et al. "Recognizing Shape Features in Solid Models." 1999.*

Han et al. "Manufacturing Feature Recognition from Solid Models: A Status Report." IEEE 2000.*

Hoffman et al. "A Road Map to Solic Modeling." IEEE 1996.*

"Method for Cataloging Elements in a Computer Aided Design", IBM Technical Disclosure Bulletin, IBM Corporation, vol. 36, No. 05, May 1993.

Han et al., "Modeler-independent Feature recognition in a distributed environment", Computer-Aided Design, vol. 30, No. 6, pp. 453-463 (1998).

Kao, et al., "Development of a collaborative CAD/CAM system", Robotics and Computer Integrated Manufacturing, vol. 14, No. 1, pp. 55-68 (1998).

Shah et al., "Experimental investigation of the STEP Form-Feature Information Model", Computer-Aided Design, vol. 23, No. 4, pp. 282-296, May 1, 1991.

deKraker, et al., "Multiple-way feature conversion to support concurrent engineering", Proceedings of the Third Symposium on Solid Modeling and Applications, Salt Lake City, May 17-19, 1995, pp. 105-114.

Middleditch et al., "A Representation Independent Geometric Modeling Kernel", Geometric Modeling and Processing 2000 Theory and Applications Proceedings, Hong Kong, China, Apr. 10-12, 2000, pp. 79-88.

Raghothama et al., "Consistent updates in dual representation systems", Computer Aided Design, vol. 32, No. 8-9, Aug. 2000, pp. 463-477.

Chen, et al, "Design Compilation of Feature-Based and Constraint-Based CAD", Solid Modeling 1995.

Raghothama, et al., "Boundary Representation Deformation in Parametric Solid Modeling", ACM Trans. On Graphics, vol 17, No. 4, Oct. 1998.

Jiri Kripac, "A Mechanism for Persistently Naming Topological Entities in History-Based Parametric Solid Models", Solid Modeling 1995.

Dadam, et al., "Database Systems as Tools in the Integration of CAx Systems", ATP Automatisierungstechnische Praxis, Sep. 1989 (translated from German).

* cited by examiner

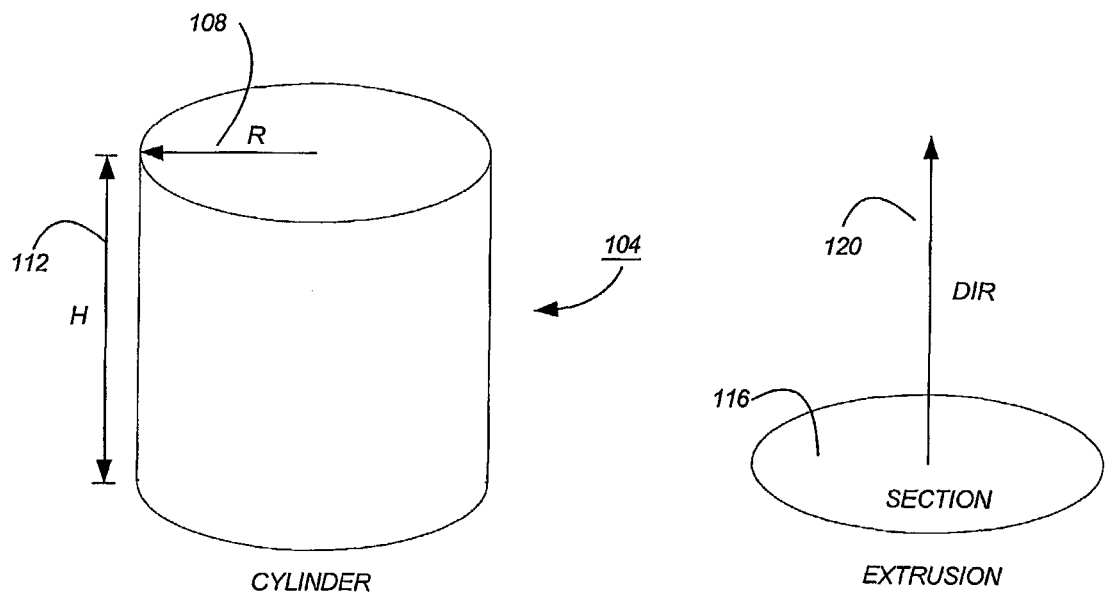
FIG. 1A
FIG. 1B
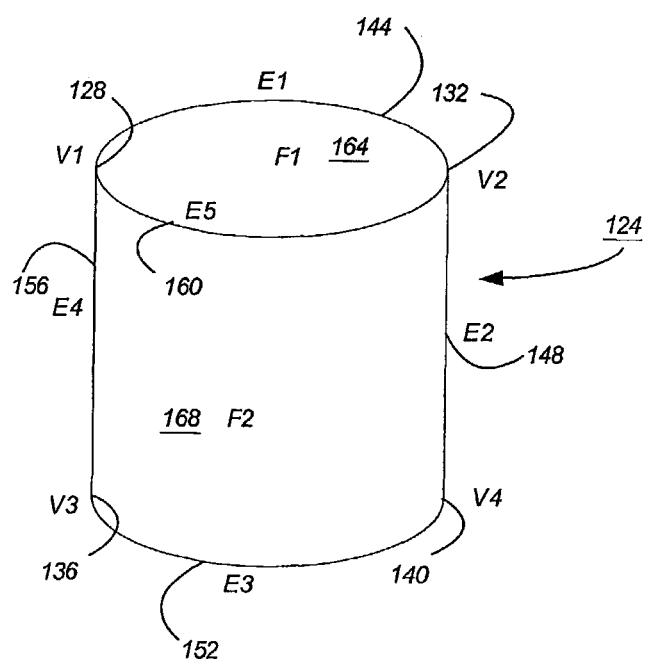
FIG. 1C

BOUNDARY REPRESENTATION PER FEATURE METHODS AND SYSTEMS

CROSS-REFERENCE TO RELATED APPLICATIONS

This application is related to U.S. Provisional Application Ser. No. 60/297,014, filed on 8 Jun. 2001 and having the same title. Priority is claimed to the '014 application. This application is also related to U.S. patent application Ser. No. 09/655,540, filed on Sep. 6, 2000, entitled "DATA EXCHANGE BETWEEN COMPUTER AIDED DESIGN SYSTEMS," also to which priority is claimed, and published PCT International Application No. PCT/IS00/01357, both filed on Sep. 6, 2000, also entitled "DATA EXCHANGE BETWEEN COMPUTER AIDED DESIGN SYSTEMS," to which priority is also claimed. All three applications are incorporated herein by reference in their entirety.

BACKGROUND

1. Field of the Invention

This application concerns data exchange methodologies for computer aided design systems, and in particular boundary representation techniques.

2. Background Information

In an earlier filed patent application, we discussed some of the challenges and drawbacks of computer aided design (CAD) technology employed by engineers, scientists, and mechanical designers. In particular, a significant technical problem for such people is not always the design work they do, but rather the means by which their design work is shared and exchanged with other engineers, scientists, designers, manufacturers, and customers. Simply put, the problem stems from incompatible, or differently modeled CAD file systems.

To solve these challenges, software designers typically approach the problem from one of two ends. For instance, the most common approach is to conform design behavior on the front end. That is, to force the input to parametric feature based design systems (PFBD systems) to conform to standard syntactical structures. This approach is described by J. H. Han et al. in Modeler-Independence Feature Recognition in a Distributed Environment, Computer-Aided Design, G B, Elsevier Science, Ltd. Publishers, B V, Vol. 30, No. 6, pp. 453-463, published May 1, 1998.

Another common approach is to focus on output file types. This approach has been employed in various forms for years by the various CAD systems vendors. IGES and STEP are standard output file types. A specific implementation using such an approach is disclosed in U.S. Pat. No. 5,717,905, by Iwamoto et al. (concerning Bezier-curve data conversion).

Another approach is discussed, albeit briefly, in Y. C. Kao et al., Development of a collaborative CAD/CAM system, Robotics and Computer-Integrated Manufacturing, Elsevier Science, Ltd. Publishers, Vol. 14, 1998, pp. 55-68. While focusing on isolation issues attendant to coediting or collaboration in CAD/CAM design, that is multi-location real-time design, Kao et al. suggest that there are two alternatives for data exchange between different CAD/CAM systems: one is by direct data base conversation and the other is through a neutral data file. Choosing the former, Kao et al. assert that the latter, neutral data exchange formats, do not support collaborative editing. Moreover, Kao et al. provide no details, beyond co-editing of a non-uniform rational B-spline (NURBS) of how such a system might operate in practice on a parameterized feature. Significantly, the data exchange process itself is secondary to the Kao et al. contribution: they are concerned with connectivity and isolation.

SUMMARY OF THE INVENTION

Computer implemented methods and systems for CAD data exchange, and in particular for creating boundary representations on a feature-by-feature basis are disclosed. According to an embodiment of the techniques described herein, a parameterized feature from a parametric based design system is exported from a source CAD system. Iterative steps and complimentary extraction techniques are employed to create a substitute design model of the parameterized feature, which can be imported into a target CAD system.

While the techniques can include API, pattern matching, and user emulation methodologies, they further include a brep per feature methodology. Notably, the brep per feature and associated techniques described herein can be used to supplement the feature extraction and importation techniques of earlier described systems, or they can be used as a fallback mechanism when such earlier described techniques fail.

By exporting the brep on a per feature basis from the source CAD system, the design intent of a CAD designer can be preserved on importation into a target CAD system. In particular, where a parametric representation of the feature fails to import into the target system, the brep of the feature can be substituted and stitched to the solid the feature modifies.

According to one embodiment, a computer implemented method for creating a boundary representation on a per feature basis from a parameterized design model comprises the steps of: extracting a parameterized first feature from a parametric based design model, the design model including a plurality of features and corresponding to a source computer aided design system; creating a parameterized export version of the first feature; classifying the parameterized first feature with respect to a type of operation represented by the first feature; creating a boundary representation from the first feature, based on the step of classifying; and associating the boundary representation with the export version of the first feature for importation into a design model for a target computer aided design system. In a similar manner, the boundary representation can be created completely independently of any parameterized versions of the feature.

According to another embodiment, the method comprises: loading the parameterized design model from a source CAD system, the design model including a plurality of features; classifying a first feature from the plurality of features with respect to a type of operation represented by the feature; creating a brep from the first feature, based on the step of classifying; and repeating the steps of comparing, classifying, and creating for additional features in the plurality of features. Additional steps can include creating a parameterized representation of the first feature; associating the paramaterized representation of the first feature with the brep of the first feature; and repeating the steps of creating the paramaterized representation and exporting for additional features from the plurality of features.

According to one embodiment, a universal product representation is created to assist with the export/import process. The universal product representation can exist as a temporary computer data structure, or it may exist as a persistent data structure, to be used in subsequent operations to export or import CAD data. The universal product representation can include both a standard parametric based version of each feature, as well as an unparameterized (boundary representation) version of the same—or even multiple boundary representations of the feature.

Additional steps, methods, techniques, and structures are disclosed herein for the CAD data exchange processes, including import and export algorithms, as well as techniques for determining the geometry of an object before and after a feature is applied. For instance, facial difference, solid difference, and boundary difference techniques are all set forth in the description below and in the accompanying figures and claims.

BRIEF DESCRIPTION OF THE DRAWINGS

FIGS. 1A-C graphically illustrate the orphan primitive. More specifically, FIGS. 1A and 1B depict paramaterized cylinders, while FIG. 1C depicts an orphan of a cylinder.

FIGS. 2A-E depict a first feature applied to a solid, while FIGS. 2F-J depict a second feature applied to the same object. FIG. 2K depicts a single feature both adding and subtracting from a solid.

FIG. 9A generally shows a communication overview between exemplary system components; FIG. 9B is a screen shot detailing aspects of selecting an object; FIG. 9C depicts monitoring display control data for changes; FIG. 10A is a flowchart depicting the main steps for user emulation; FIG. 10B is a flowchart detailing exemplary set-up operations; FIG. 10C is a flowchart detailing exemplary element selection operations; and FIG. 10D is a flowchart detailing exemplary verification operations.

FIG. 11A is a perspective view of a source object and an edge; FIG. 11B is a perspective view of the source object with a feature applied to the edge; FIG. 11C is a perspective view of a target object and an edge; FIG. 11D is a perspective view of the target object with the feature applied to the edge; and FIG. 12 is an operational overview of a computer implemented edge selection process. FIG. 13 is a flowchart depicting a method for detecting whether two edges overlap. FIG. 14 is a diagram of a source edge and a series of target edge candidates that illustrates a technique for determining regions. FIG. 15 is a flowchart depicting an edge containment algorithm. FIG. 16 is a flowchart depicting a method for detecting an initial edge. FIG. 17 is a flowchart depicting a chain extension algorithm.

FIG. 18 generally shows the data flow between exemplary system elements; FIG. 19 shows an exemplary data matrix; and FIG. 20 is a flowchart detailing exemplary feature pattern matching operations.

DETAILED DESCRIPTION OF THE PREFERRED EMBODIMENTS

Figure 2A:
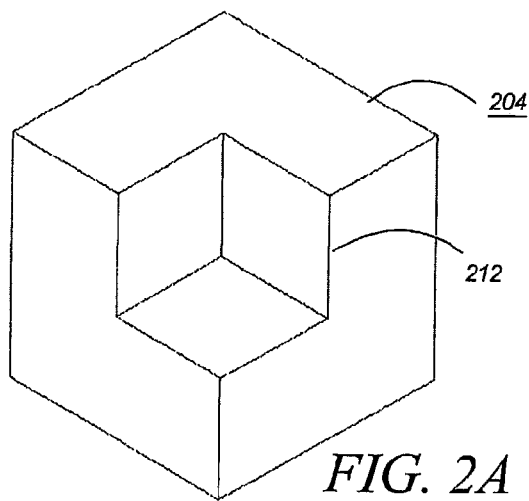
FIGS. 2A-K illustrate a sewing primitive. More specifically.

When a geometric object is constructed in a CAD system, and more particularly a PFBD system, the solid is typically specified as a sequence of operations, which are called features. Each of these operations creates new geometry or modifies an existing geometry. The result of the geometries, all of them together, is sometimes called a boundary representation, or "brep". Hence, in ordinary usage, a brep is not a feature, but the overall geometry of the object—the geometric point sets of the object which allow the object to be rendered in a CAD system. Departing from common usage of the term, brep in this detailed description is inclusive of a brep of a feature.

In U.S. patent application Ser. No. 09/655,540 and published PCT International Application No. PCT/US00/01357, both filed Sep. 6, 2000, and entitled "DATA EXCHANGE BETWEEN COMPUTER AIDED DESIGN SYSTEMS", both of which are incorporated herein by reference in their entirety where permissible under applicable patent law, we disclosed methods and systems for data exchange between CAD systems. More specifically, we disclosed application programming interface, pattern matching, user emulation, and boundary representation techniques for exchanging design data, including parametric based design data, between two differing CAD systems.

As a fallback to the first three approaches, exporting a boundary representation of the source design model into the target design model was employed. However, a drawback to this approach can be the loss of design intent in the design model, which is embodied in the parametric syntax.

This so-called "loss of design intent" can make features difficult to identify; or, perhaps more aptly: the designer's intent more difficult to discern. When dealing with non-associative features, that is features that are independent of other features, the loss of intent is not necessarily a drawback, but when dealing with associative features, that is features that are dependent upon other features, this loss can be problematic.

For instance, for associative features such as a chamfer, the chamfer is applied to an edge of a solid. (By associative, we mean that there is some sort of dependence in the operation that defines the feature on some other feature—that is, the feature is associated with some part of one or more other features.) If, for some reason, the edge in the solid could not be identified, then the chamfer operation may be unable to operate.

Our solution to this drawback is to export a boundary representation (brep) for each feature, rather than to export the brep for the entire solid. In other words, we create an unparameterized representation of a parameterized feature. A primary advantage of this approach is that features for which parameterized representations can be created are allowed to persist, rather than being subsumed into a larger boundary representation. Consequently, less parametric information is lost in the CAD data exchange.

Another advantage is that a fallback mechanism can exist when parameterized data exchange fails or simply does not exist. (We note that the brep per feature approach can be performed on all of the features, only user specified features, only features that otherwise fail parameterized import, or any combination of the above.)

The result is that more design intent can be preserved using our brep per feature (BPF) approach. The methods and systems associated with BPF are described in further detail below.

BREP PER FEATURE PRIMITIVES

Before beginning detailed discussion of the overall process, some initial matters warrant discussion. The brep per feature approach we undertake currently has four primitives—that is, building blocks for the BPF mechanism. For the purpose of illustration, we will refer to these primitives as orphan, sew, Boolean operations, and hybrid features. A common characteristic of the primitives is that they are each unparameterized.

Turning to FIGS. 1A-C, they graphically illustrate the rewrite process to an orphan primitive. The orphan primitive is used to create unparameterized solids or skins from a boundary representation, the orphan being a feature that holds the boundary representation.

In FIG. 1A a feature, here a cylinder 104, is shown. The parameters of the cylinder 104 include its radius 108 and height 112. In FIG. 1B, the cylinder 104 is re-written as an extrude operation performed on a section, here the section 116 is specified and a directional vector 120 is a parameter.

In FIG. 1C the parameterized feature of FIGS. 1A or 1B is re-written as an unparameterized feature. Here, the unparameterized feature is an orphan 124. The orphan in this example comprises four vertices (128-140), five visible edges (144-160) connecting these vertices, and two visible faces (164 and 168) created between the connected sets of edges and vertices—each is called out in the drawing. Not visible in FIG. 1C are two faces (opposite face 168 and another opposite face 164), and one edge (complimenting edge 152 and separating the two hidden faces opposite face 164 and face 168).

If a feature (for example: a cylinder, a box, a sphere, an extrude-create, a loft-create, a close, an offset operation, or another operation) has a non-associative property, then the operation is classified as a pure creating operation. Pure creating operations can be re-written using the orphan primitive as is depicted in FIGS. 1A-C.

Figure 2B:
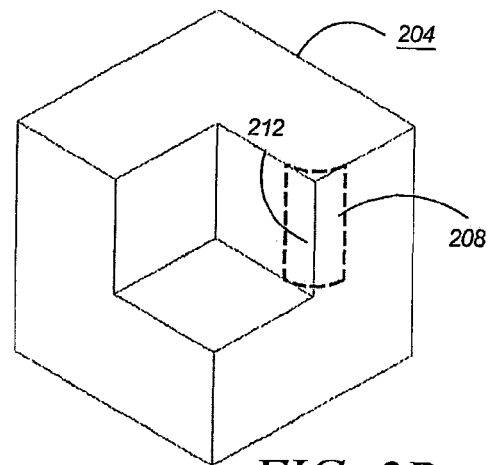

The sewing primitive is best illustrated with reference to a round feature applied to a solid. For this we turn to FIGS. 2A-E. In FIG. 2A, a solid 204 is shown. In FIG. 2B, a round operation is performed on an edge 212 of the solid 204. (Note that the round operation is not completed as shown in FIG. 2B, but would be as shown in FIG. 2E.) When exporting the parameterized round feature from the source CAD system's design model, it is possible that the round fails to import into a target CAD system. In such a case, the sewing primitive is a good fallback mechanism.

The sewing primitive takes two arguments as inputs: a skin and a solid. The skin is sewn to the boundary of the solid, the solid on the material side of the skin is kept, and the solid on the non-material side of the skin is discarded. Preferably, two conditions are satisfied for the sewing operation. First, the edges of the skin on the boundary of the skin, i.e., the free edges, must lie on the faces of the solid. Second, the skin should partition the solid into regions that are on the material side of the skin and regions that are on the non-material side of the skin.

Explained another way: create edges on the solid where the free edges of the skin exist. Next, with an imaginary pair of scissors, cut the boundary of the solid along the free edges of the skin. This will partition the solid into disjoint skins. Next, discard the skins that are not oriented properly with respect to the skin that we are sewing. Two skins can be said to be properly oriented if they can be stitched together and have a consistent material side. Finally, stitch the remaining skins together with the given skin. Any of the figures can be used to illustrate this example, and in particular FIG. 2K. (Another example of the conditions is presented below with reference to FIGS. 3A-B.)

Returning to FIGS. 2B-E, in FIG. 2B the solid 204 is depicted together with a skin 208, the skin 208 representative of a round operation.

Figure 2C:
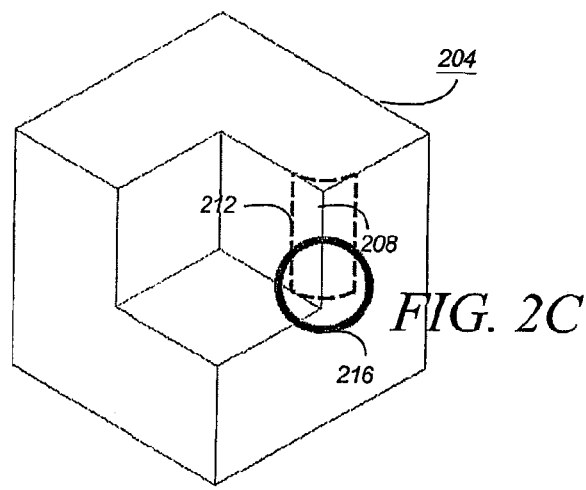

Turning to FIG. 2C, note that the region 216 called out by the circle lies inside the material region of the solid 204. The first condition, described above, is not satisfied by the lower edge of the skin 208.

Figure 2D:
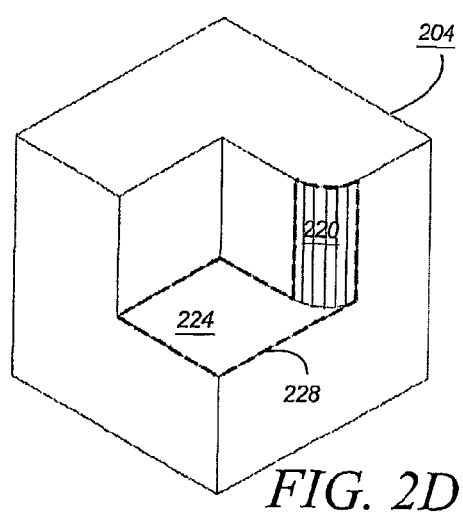
Figure 2E:
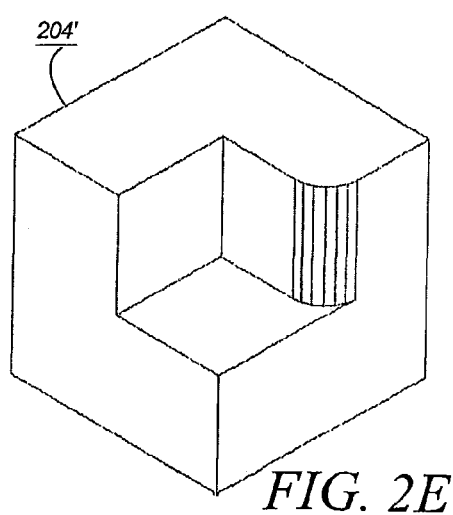

Referring to FIG. 2D, a minimum set of faces is selected that define the round. Here, the face representing the round 220 is selected, as is a bordering face 224 on the solid 204. Note that two faces are selected in FIG. 2D, as either face alone would not satisfy the first condition. Also note that the face selections partition the solid into regions on the material side and non-material side of the skin 228. After selecting the faces, the skin 228 (which is the combination of the two select faces 220 and 224) is sewn to the material side of the solid 204 and the region in the non-material side is disregarded. The result is shown in FIG. 2E as a solid 204'.

Turning next to the sequence of FIGS. 2F-J, they depict a round operation that is adding, as opposed to subtracting, from the solid (the same solid depicted in FIG. 2A). As the process was already above with respect to FIGS. 2A-E, it will not be labored again. Rather, particular differences are pointed out. Furthermore, as is depicted in FIG. 2K, a sewing operation can both add and subtract material from the solid 204''' at the same time (added material 252, subtracted material 256).

Figure 2F:
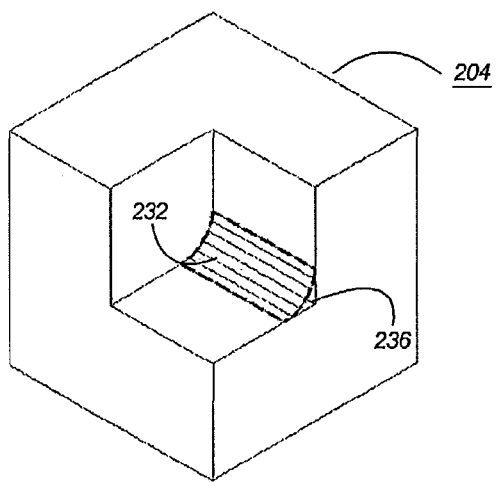
Figure 2G:
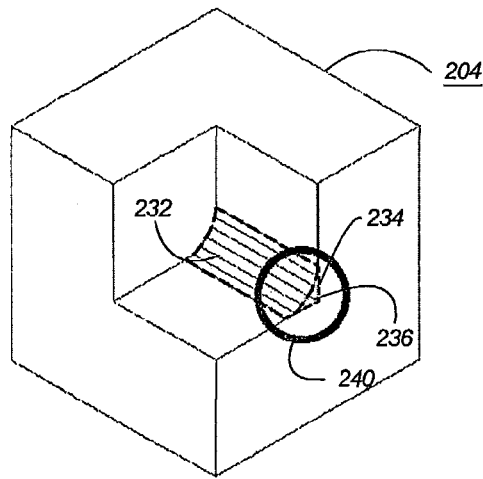

FIG. 2F depicts a round applied between two faces of the solid 204, and more particularly above the edge 236, which is substantially hidden. The round is depicted as a skin 232. Turning to FIG. 2G, a portion of the region beneath the face 232, but above the original solid 204, is called out as region 240. An objective with a skin like skin 232 is to sew it to the solid 204.

Figure 2H:
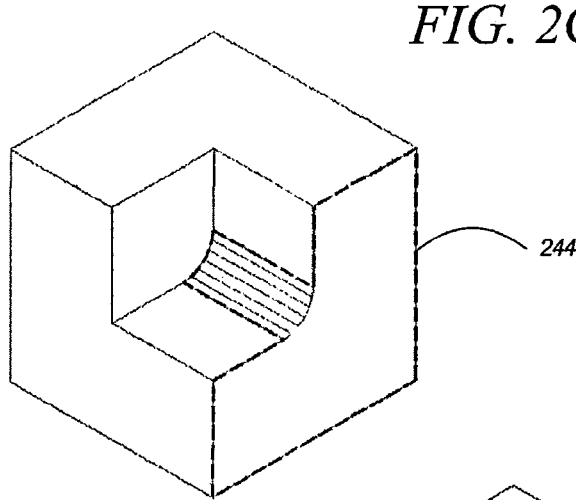
Figure 2I:
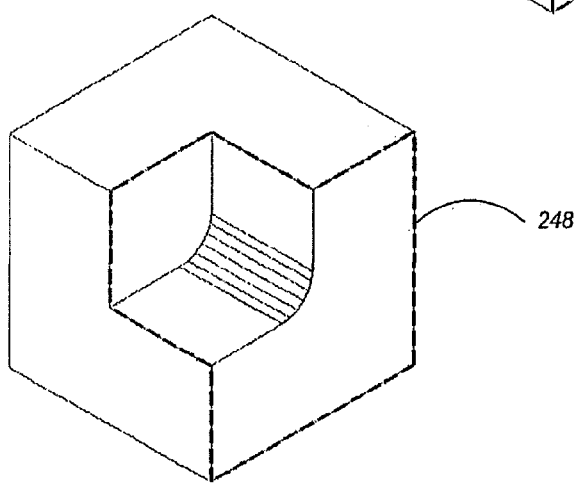
Figure 2J:
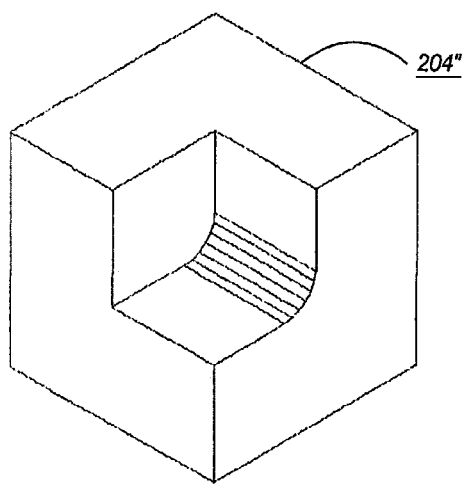
Figure 2K:
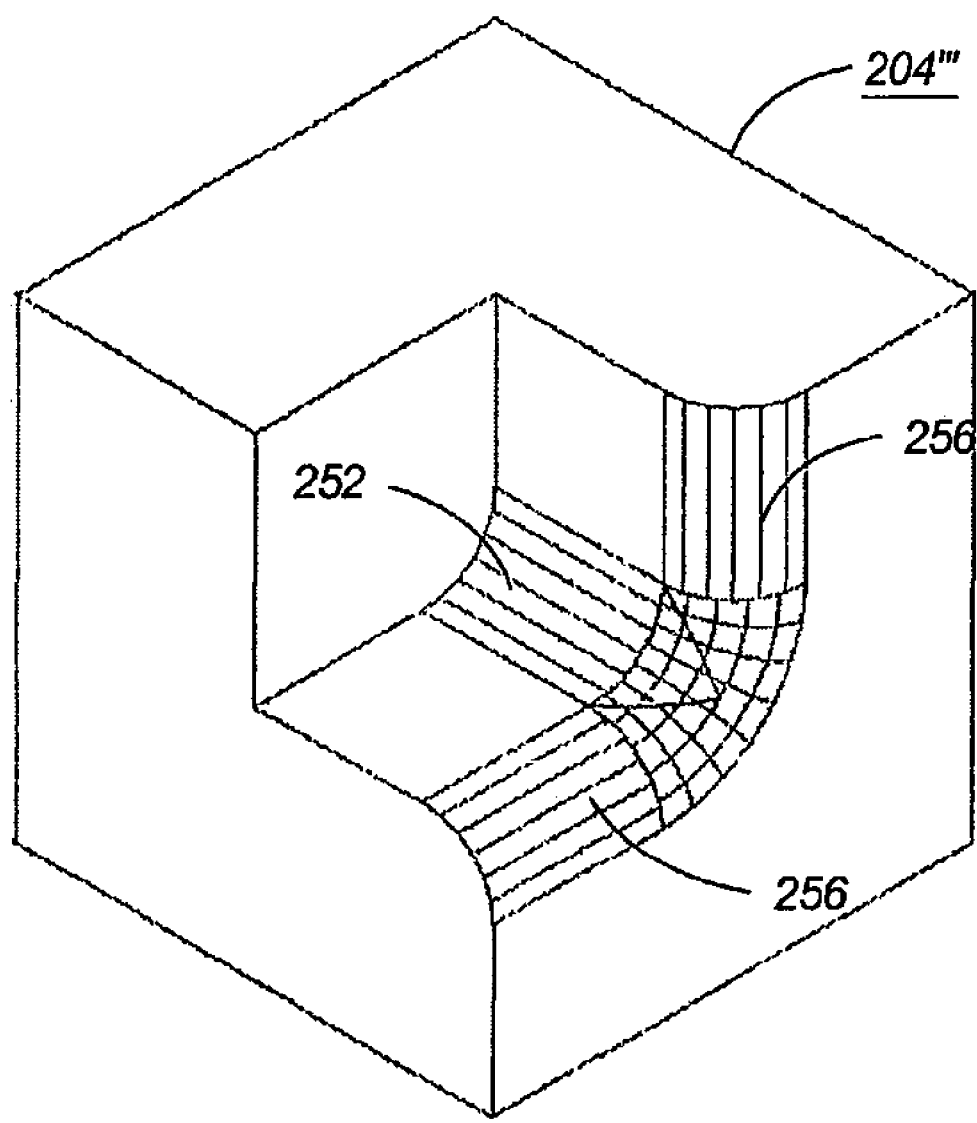

FIGS. 2H-I illustrate the face selection process. FIG. 2H being a first set of faces 244 effected by the feature, and FIG. 2I being all the faces 248 effected by the feature. FIG. 2J depicts the final solid with the skin stitched to it; it is called out as solid 204''.

It is noted here, with respect to FIGS. 2F-2J, and will be discussed below with reference to FIG. 6C, that a boundary differences algorithm can also be used for calculating the resultant solid 204''. Notice in FIGS. 2F-G that a small portion of the horizontal face that connects to edge 236 is hidden. Together the face 232 and the vertically oriented pseudo-triangular face 234 represent the minimal skin, with respect to the surface area, that can be used to reconstruct the round feature using the sewing operation. This minimal skin is precisely the boundary difference between the solid 204'' (after the round) and the solid 204 (before the round). The brep of the boundary difference can be used to reconstruct the round feature using the sewing operation. Again, this is illustrated here because of its relationship to the sewing primitive and also because it graphically illustrates the boundary differences technique discussed below.

Figure 3A:
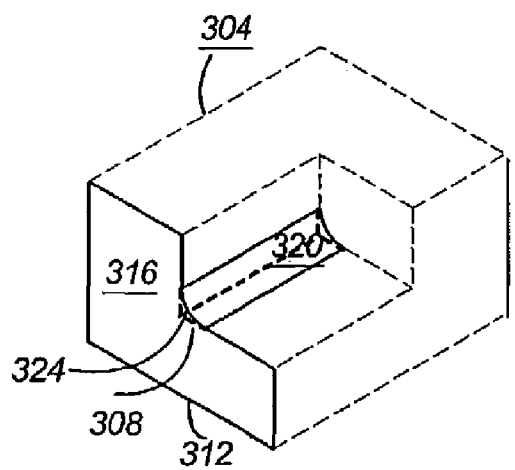
FIGS. 3A-B illustrate additional aspects of a sewing primitive.
Figure 3B:
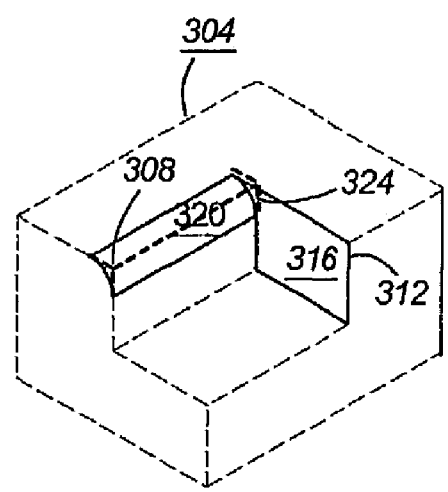

Returning to the conditions that are preferably satisfied for selecting faces of the skin, we turn to FIGS. 3A-B. Each figure depicts a solid 304 with a round applied to an edge 308. A skin 312 on each solid, delineated by heavy lines, captures the round feature. Notice that each skin 312 has two faces (316 and 320). While there are five faces (one new face lying on the new surface created by the round and four faces that were modified by the round—these faces adjacent to the new face) that completely define the round, two are sufficient.

To determine the faces, a naming system, for example the one described below, can be employed. In one embodiment, the naming system returns the faces that remained exactly the same after the operation (here, the operation being a round). Thus, knowing all faces, the remaining faces are the faces that completely define the operation. This can be called a "strong naming" system. In another embodiment, a "weak naming" system can be employed, the weak naming system indicating the new face(s) created by the operation. Using a weak naming system will typically require selection of the adjacent faces as well. The faces ultimately used would be those faces meeting the criteria above. Note, however, that this is an optional step that optimizes the algorithm.

The first condition, on the free edges of the skin, is satisfied. The free edges of the skin lie on the faces of the solid 304. Note that either face, alone, does not satisfy this condition. The second condition, that the skin partitions the solid into regions, is also satisfied: here, there is a material side and a non-material side created by the skin. Note the faces removed by the skin, namely those faces incident to dashed line 324.

It is possible for multiple skins to be reflected in a feature. In target systems that do not support a multi-sewing operation, the multiple sewing operations are performed as a series of single-sewing operations.

Another primitive is a Boolean operation. Boolean operations include operations between two solids, such as unite, subtract, and intersect. In addition to being operations between solids, the Boolean operations can be between a solid and a skin. For instance, Boolean operation can be used in replace of a sewing operation. Furthermore, if the above two conditions referenced above with respect to the sewing primitive are satisfied, then it is possible to re-write the sewing operation as two Boolean operations: first the non-material side of the skin is subtracted from the solid, then the skin is united with the result.

A fourth primitive is the hybrid primitive. It is a combination of any of the three primitives discussed above. For example, a hybrid primitive can be an orphan-add or an orphan-sew combination.

Brep Per Feature

Figure 4:
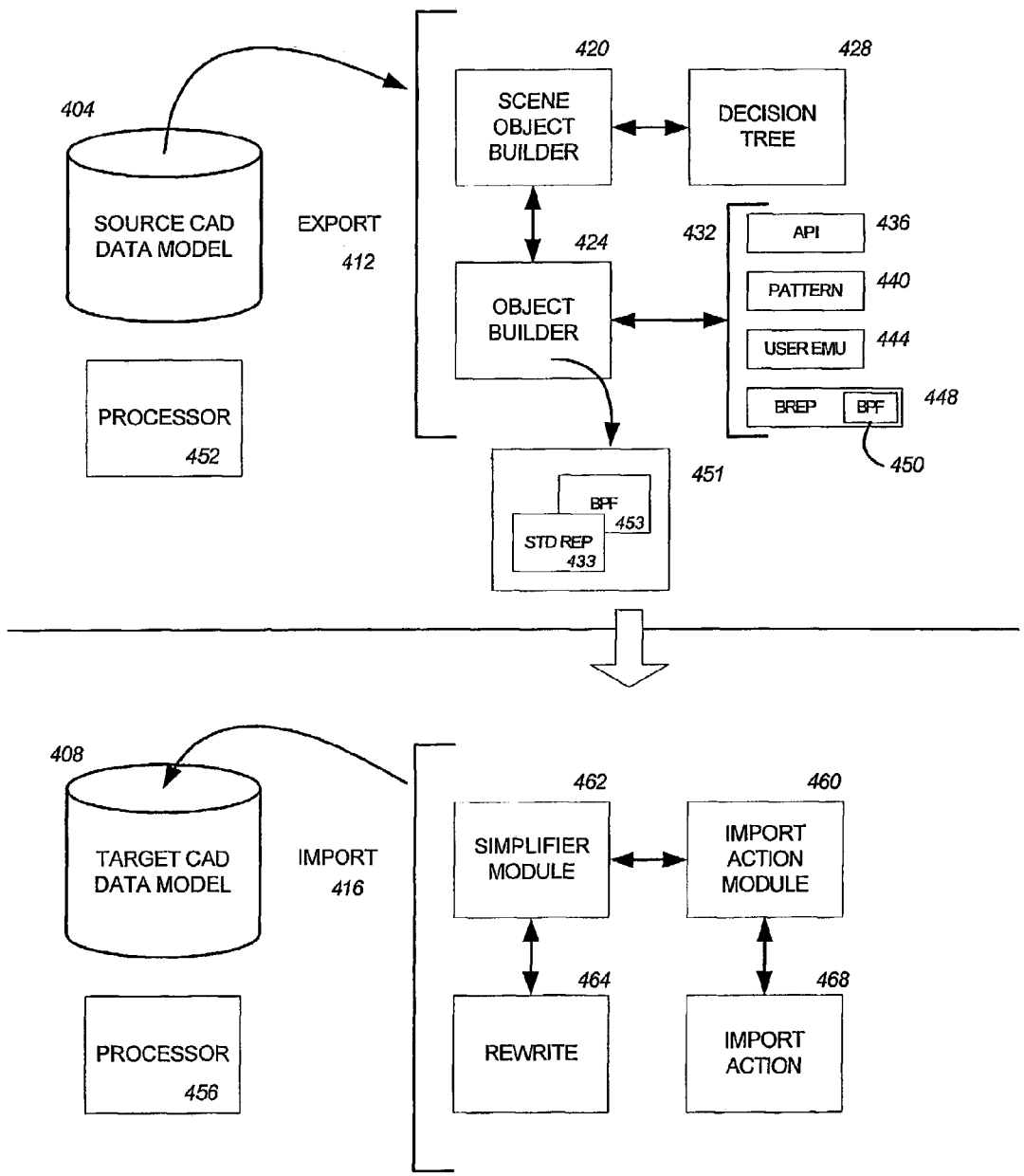
FIG. 4 depicts an overview of the data exchange process, which can include both export and import methodologies.

Now that the primitives are described, a functional description of CAD data exchange with BPF is presented. Turning to FIG. 4, it is a flowchart depicting a scenario under which the BPF methods and systems would be employed. As was mentioned above, BPF is envisioned to be employed as a complimentary algorithm for CAD exchange, and in particular where the data exchange is between computer aided design systems that have otherwise incompatible file structures. While the description and the accompanying figures are described with this legacy in mind, it is appreciated that the forgoing techniques can be employed in other environments and independent of a failure of another CAD data exchange technique.

According to one embodiment, the primary components of the data exchange system are a source CAD data model 404, a target CAD data model 408, and one or more processors (e.g. processors 452 and 456), and computer software product (configured to implement the functionality and/or steps described below). An export process 412 operates, by way of computer software product executed on processor 452, on the source CAD data model 404 to extract the features from the model 404. In a complimentary fashion, an import process 416 operates through processor 456 on the exported data model 451 (also called a universal product representation or "UPR") from the export process 412 to input the UPR 451 in a representative fashion into the target CAD data model 408. It is noted that the UPR 451 from the export process 412, and the input to the import process 416 can be transitive in nature or persistent.

The export process 412 is depicted as a series of functional blocks. Each bock can comprise sequences of computer program code that is divisible from the other blocks. Block 420 is the scene object builder, which calls one or more object builders 424. The object builders 424 construct the elements of the data model from a feature tree. For each element identified from the scene object builder 420, a decision tree 428 is used to locate the appropriate object builder 424 to call. The object builders 424 perform iterative export methodologies 432 in an attempt to create the element.

According to one embodiment, the export methodologies include an application programming interface mode 436, where an API in the source CAD system is used to create the element, a pattern matching mode 440, where recognized operations form the source CAD data model 404 are mapped to corresponding operations in another data model or intermediate model. The export methodologies can further include a user emulation mode 444, where user emulation techniques are used to emulate the actions of an actual CAD user in a creation, selection, or export process, as well as examining data sent to a display, and using pull-down menus generated for the display, and a boundary representation mode 448. The boundary representation mode 448 further includes a boundary representation on a feature-by-feature basis (BPF module 450).

Each export methodology compliments the others. For instance, in using the API, user emulation may be necessary. Furthermore, we can export a BPF even if the API, pattern matching, user emulation, or any combination of the above are successful in creating a parameterized representation. Likewise we can, instead or further, export an entire brep.

The data result of the export process 412 is a computer readable data structure UPR 451, which comprises a standard parametric representation 433 of a feature (for example a parametric representation of the feature in a non-native format), and an unparameterized representation 453 of the feature (for example a brep). According to one embodiment, multiple breps for a single feature are included in the UPR 451, each being created by a unique algorithm.

Before moving on, it is noted that the UPR 451 can include a plurality of features, each feature having a parameterized representations 433 and an unparameterized representations 453. Corresponding (or "matching") representations 433 and 453 can be logically or physically associated (or "attached") to each other. For instance, a data dictionary in the UPR, or corresponding thereto, can make the appropriate associations and, for example, specify the mode or operation(s) by which the representations were created. Alternatively, the UPR components can by physically arranged so that their relationship is implicit or called out by some other identifying data.

Once the source CAD data model 404 is exported, the import process 416 takes over. Here again, the blocks can be represented physically as multiple blocks of computer program code, which are executed by a processor, such as processor 456. The processor 456 is typically associated with the target CAD system.

Continuing with the data flow through the system, the UPR 451 from the export process 412 is processed by the import software 416, which operates one or more processors as follows: Each of the features from the export 412 is looped over in some order. This order can be user specified, data structure specified (for instance from the data model in the source CAD system), CAD system specific, or specified by another means. For each feature, an import action module 460 is called. The import action module 460 comprises import actions 468, which are procedures that import particular features (the subject feature) into the particular target system 408.

If an import action 468 does not exist or fails to execute successfully, then a simplifier module 462 is invoked. The simplifier module 462 calls a rewrite function 464. The rewrite function 464 rewrites the feature as a different feature or a set of features. After the rewrite function 464 is completed, then the import action module 460 again attempts an import action 468. (It is noted that the simplifier modules are described in greater detail below with reference to FIG. 7.)

If the rewrite function 464 and second import action 468 are not successful, then the simplifier 462 rewrites the feature to an orphan feature. If the orphan feature has a brep (BPF), then the simplifier 462 succeeds, otherwise it fails. (It is noted that for simplicity, only two rewrite 464 and import 468 actions are described. In fact, several iterations of the two can be attempted before the orphan feature is created.)

For instance, if a brep for a feature is a single skin, then the simplifier 462 can re-write the feature as an orphan-sew operation. On the other hand, if the brep for a feature comprises multiple skins, then the simplifier 462 can re-write the feature as a series of orphan-sew operations (a "multi-sew" operation). Further still, if the brep is a single solid, then hybrid re-writes can be implemented by the simplifier, such as an orphan-create, add, cut or intersect.

Export Algorithms

Figure 5:
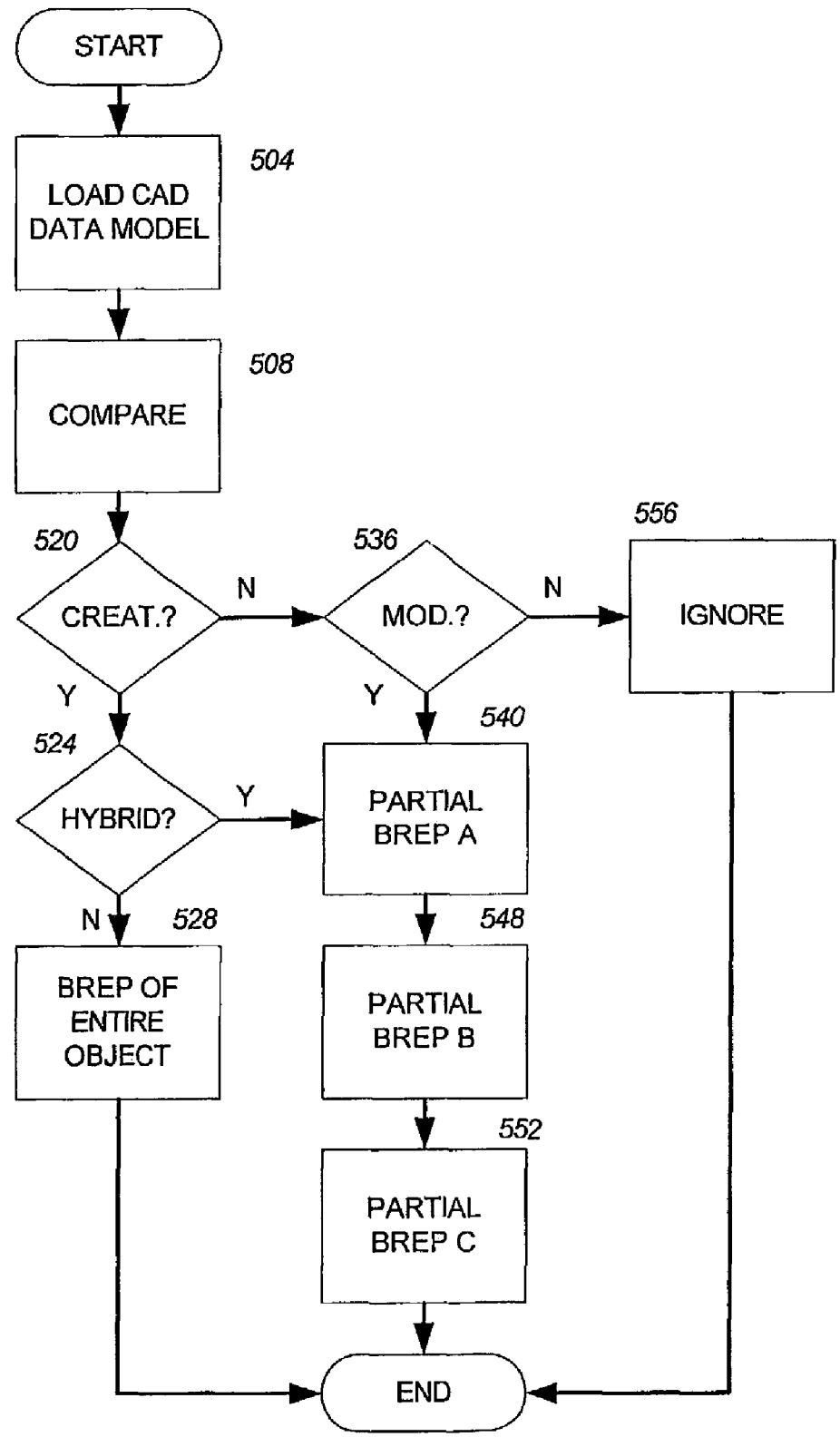
FIG. 5 is a flowchart depicting an export process.

FIG. 5 is a flowchart depicting a BPF export algorithm according to an embodiment. In step 504, the source CAD data model is loaded into memory associated with the processor that performs the export process. In step 508, features from the loaded data model are interrogated against a knowledge base so that they can be classified. The classification steps are further shown in FIG. 5 as decision boxes 520 and 536.

In box 520, a decision is made as to whether the feature is a creating operation. A general characteristic of a creating operation is that the operation creates a standalone solid. For instance, creating operations include solid primitives, such as block, cone, cylinder, and sphere. Creating operations can further include section-based primitives, such as extrude, revolve and sweep.

While this classification technique is a rule of thumb, it is not necessarily the end of the inquiry. For instance, our experiments have determined that in certain CAD systems, hybrid features, such as extrude-add, may or may not be classified as creating operations.

For instance, in a UniGraphics CAD system, the solid created by the extrude-add operation is no longer standalone. In such a case, certain known hybrids and exceptions may be further tested, beyond the general classification, to determine whether they fall out of the creating operation classification.

A second test, depicted as box 524, is thus shown. The test is configured to determine whether the feature is the result of a hybrid operation. If the operation is a hybrid operation, then processing continues to step 540, which is described below. However, if the operation is not a hybrid operation, then in step 528 a brep of the entire feature (BPF) is exported. From step 528 the process can terminate or move on to a next feature.

In box 536, a decision is made as to whether the feature results from a locally modifying operation. Modifying operations can result in features that locally modify the brep topology, as is the case in the operations round, chamfer, and draft. These operations create skins, which are combined with the associated solid using the sewing primitive (described above).

According to an embodiment, a partial brep is exported that comprises one or more skins, preferably using the facial differences technique, which is again described below with reference to FIG. 6B. In another embodiment a boundary differences technique can be employed, which is described below with reference to FIG. 6C.

Figure 6A:
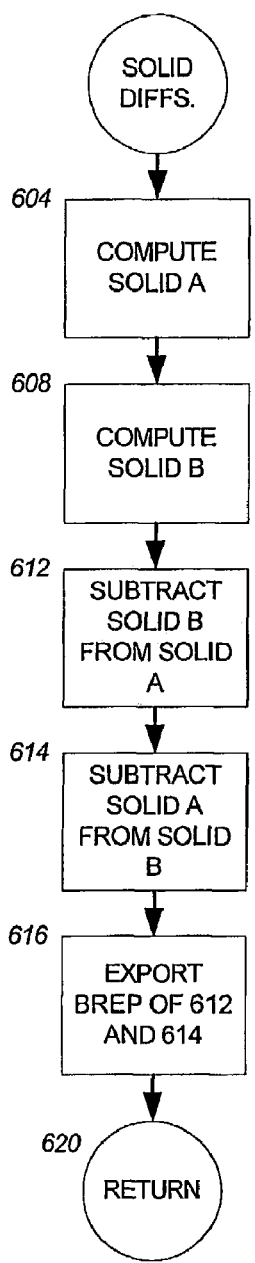
FIGS. 6A-C are flowcharts depicting solid difference, facial difference, and boundary difference algorithms, respectively, which can be used in the export process.

However, the feature may have resulted from a globally modifying operation. A general characteristic of a globally modifying operation that it modifies an entire solid. An example of such an operation is the shell operation. If the operation is a globally modifying operation, then a partial brep can be exported using a solid differences technique (FIG. 6A).

However, in another embodiment, and in particular in some CAD systems, it can be easier to extract the skins for globally modifying operations than compute the solid that is defined by these features. Returning to the solid difference technique, in the case of a regular shell operation performed on a block, the solid difference is the cavity created by the shell. That is, we process the modifying operation (here, "unary" operation can be more apt) by exporting a brep using both the facial differences and solid differences approach. In this case, if during import one fails, we will have a fallback.

Returning to the flow from box 536, if the operation that created the feature was a modifying operation, then in step 540, a partial brep (e.g. a skin) is exported. According to one approach, the facial difference technique is employed. Next, in step 548 a partial brep is attempted again, this time using a different approach. For instance, if the facial differences approach was used in step 540, then in step 548 a solid differences technique can be employed.

In step 552 another partial brep can be attempted, this time using still another approach. Here, for instance, the boundary differences technique can be employed.

If the decision boxes 520 and 536 did not create positive results, then in step 556 feature is, for practical purposes, classified as irrelevant. Such a classification can be explicit or implied by the fact that nothing is done. Beyond failing the create and modify tests, characteristics of an irrelevant feature can include that the feature does not represent a geometric structure that has a brep.

For instance, a reference geometry feature, or a sketch feature does not have a brep, so both would be classified as irrelevant features. Other features that can be classified as irrelevant features are those that are not supported by the BPF fallback mechanism, and any of the primitives discussed above. In the event that a feature is classified as an irrelevant feature the export process can terminate or move on to the next feature.

Solid Differences

FIG. 6A is flowchart depicting a solid differences algorithm or technique, which can be a sub-process in the export algorithms. The concern with this algorithm is identifying the changes made to a solid by a feature and determining the brep for the changes (the feature) between the initial instantiation of the solid and the solid after the feature is applied—i.e., a brep per feature.

To this end, in step 604 the processor executes steps to compute the solid prior to the feature being applied. Let this solid be represented as S(A). In step 608, the processor executes steps to compute the solid after the feature was applied. Let this solid be represented as S(B).

Next, in step 612 the algorithm causes the processor to subtract S(B) from S(A). The result is a solid, the solid being a Boolean difference between the two solids. This result, S(A−B), is represented as a brep. In step 614, the algorithm causes the processor to subtract S(A) from S(B), which is again represented as a brep—S(B−A). In step 616 the breps of S(A−B) and S(B−A) are exported, to be used later to build a brep representative of the feature.

Discussion of the complimentary import process is warranted here. Returning to FIG. 4, if the import action 468 exists for the feature that created B from A, then the import action 468 will succeed and the import algorithm 416 is done. However, if it does not, then the simplifier module 462 is invoked and a rewrite 464 is attempted. If the facial differences technique failed, then the solid differences technique is attempted. For instance two orphans can be used: orphan-add(S(B−A)) followed by orphan-cut(S(A−B)). The premise is $$A+(B-A)-(A-B)=B \qquad \text{EQ. 1.}$$

Facial Differences

Figure 6B:
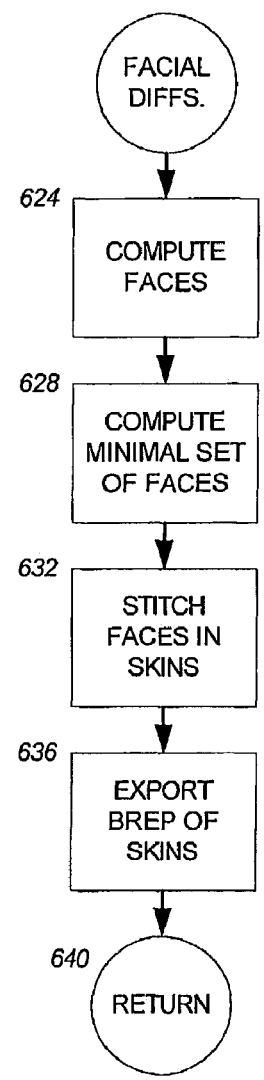

FIG. 6B is a flowchart depicting a facial differences algorithm or technique, which can be a sub-process in the export process.

In step 624, the set of faces in the solid with the feature, which do not appear in the solid prior to the feature, is computed. For instance, let F(A) be the set of faces in the solid prior to the feature and let F(B) be the set of faces in the solid after the feature. Applying a Boolean difference between the faces of A and the faces of B, that is F(B)−F(A), yields both the newly created faces and the modified faces lying on the preexisting surfaces of the solid. However, a geometric algorithm can also be applied to compute the difference, such as a boundary difference algorithm.

One approach to computing the faces is to use a naming mechanism. In this approach, if the feature maintains a list of the faces that it contributes to the current (but not the final) brep, then there is no work to be done: the set of faces that do not appear is known. However, if a face was modified, then it might not appear in the naming mechanism. In such a circumstance, a superset of faces can be created, the superset including neighboring faces to the newly added faces so that changes to prior faces can be detected.

In step 628, which is an optional but not a necessary step, a minimal set of faces is computed. Here, faces that lie completely on the boundary of the original solid are eliminated, because, referring to the constraints on the sewing primitive, discussed above, they are not needed. By employing this technique, it is possible to compact the result and use less storage.

In step 632, the faces are stitched into connected components, or skins. One technique for stitching the faces into connected components is to interrogate the topological structure of the brep.

In step 636 the brep representative of the skins is exported, and in step 640, the process returns to the algorithm that called it.

Boundary Differences

Figure 6C:
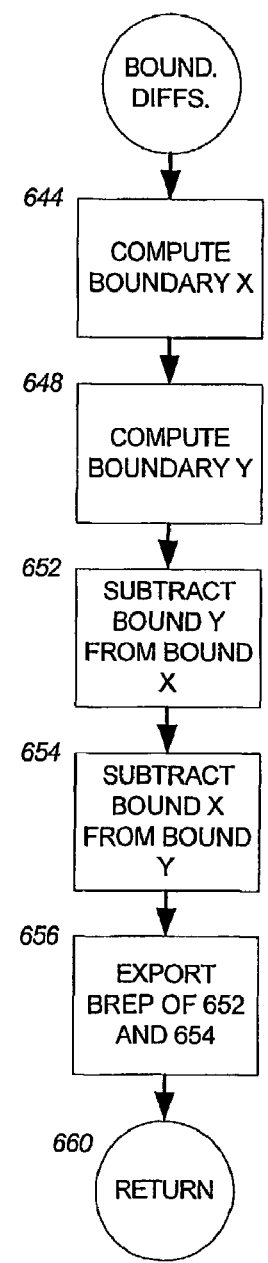

FIG. 6C is flowchart depicting a boundary differences algorithm, which, like the algorithms above, can be a sub-process in the export algorithms. The objective in this algorithm is to identify the changes made to the boundary of a solid by a feature and determining the brep for the changes (the feature) between the initial instantiation of the solid and the solid after the feature is applied. (It is noted that an application for this algorithm is described and illustrated above with reference to the discussion of the sewing primitive and FIGS. 2F-G.)

In step 644 the processor executes steps to compute the boundary prior to the feature being applied. Let this boundary be represented as B(X). In step 648, the processor executes steps to compute the boundary after the feature was applied. Let this boundary be represented as B(Y).

Next, in step 652 the algorithm causes the processor to subtract B(Y) from B(X). The result is a skin, the skin being a Boolean difference between the two boundaries. This result, B(X−Y), is represented as a brep. In step 654, the algorithm causes the processor to subtract B(X) from B(Y), which is again represented as a brep—B(Y−X). In step 656 the breps of B(Y−X) and B(X−Y) are exported.

As was the case in the solid differences algorithm, discussion of the complimentary import process here is warranted. Returning to FIG. 4, if the import action 468 exists for the feature that created B from A, then the import action 468 will succeed and the import algorithm 416 is done. However, if it does not, then the simplifier module 462 is invoked and a rewrite 464 is attempted. If the facial differences technique or solid differences failed, then the boundary differences technique can be attempted. For instance two orphans can be used: orphan-add(B(Y−X)) followed by orphan-cut(B(X−Y)). The premise, again, is found in EQ. 1 (above).

Cad Specific Algorithms

The above description was a general, but specific, presentation on the BPF algorithms and systems. We note that in the process of implementing and experimenting with these algorithms on various types and versions of CAD systems, some of our current and evolving implementations tune these general algorithms for the specific systems. These experiments have been built upon knowledge one of skill in the art would have with respect to a specific system and/or publicly available information, such as system documentation or user support. These modifications are presented below.

For the CATIA system: Facial differences are calculated by (1) extracting the R-surfaces from the Catia primitive, (2) computing the bounding R-edges, (3) eliminating the R-edges that are on the boundary of the solid that existed before the modifying operation was applied, (4) computing the R-surfaces that are adjacent to the remaining R-edges, and (5) extracting the skins from the connected components of the R-surfaces. We noted that step (3) is not required, since its primary advantage is reducing the size of the exported skin (i.e., a minimal set of faces). A geometric algorithm can be used in step (3).

For the I-Deas system: The entire brep exported for creating operations can be extracted through a history tree. Each history tree has a feature node, and the feature node has a feature model. The feature node represents a solid that is rooted at the featured node and defined by the underlying sub-tree. The feature model contains the brep of the feature node. Turning to facial differences, the naming mechanism here makes use of the tracking ID feature in the I-Deas system. Here, we give every entity a tracking ID.

For the ProEngineer system: Because of the structure of the history tree, every creating operation, except the first, is a hybrid operation, thus the classification of creating operations is an exception here to the normal classification methods. Thus, every creating operation is really a unary operation that may globally modify the part. However, the representation of the feature includes information about the feature itself. Thus, the brep can be extracted from this self-encapsulated data dictionary in the feature. When constructing the brep from a ProEngineer system, the surfaces of the feature should be searched to identify those surfaces that are active and those that are inactive.

For the UniGraphics system: an internal naming scheme identifies the faces that were created by the feature. The naming scheme enables us to easily identify and select faces affected by the feature.

We further note that the orphan-sew operation is handled by the respective systems as follows: in Catia, a sewing operation, in ProEngineer and UniGraphics, a patch feature, in I-Deas, a project curve, delete faces, and join operations.

Import Algorithm

Figure 7:
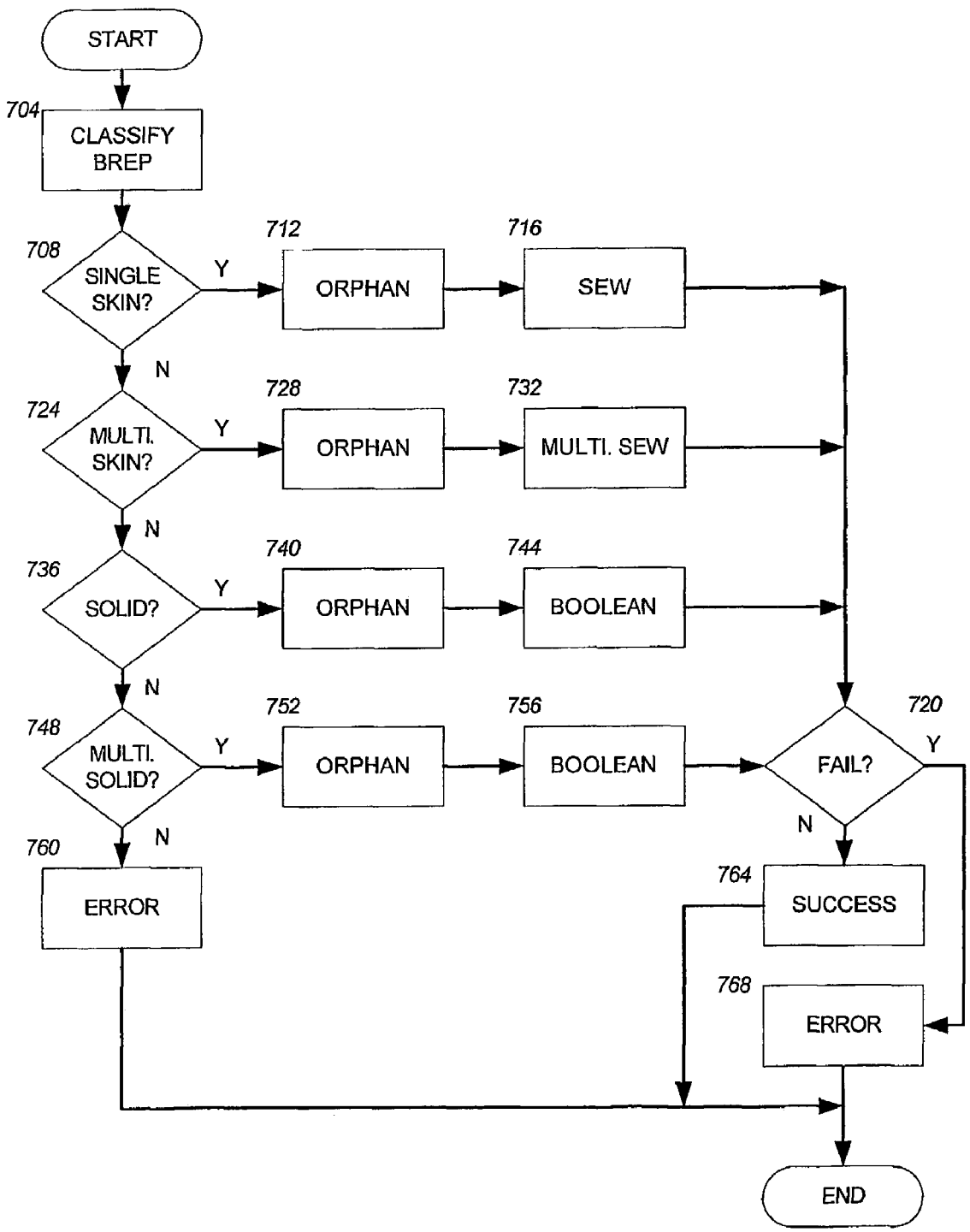
FIG. 7 is a flowchart depicting a brep per feature import process.

FIG. 7 depicts an import process, the import operating on the output of the export process. More particularly, FIG. 7 depicts the BPF simplifiers that are applied during the import process if the feature simplifiers fail or the corresponding import actions do not exist. It is noted again that the BPF simplifiers, according to an embodiment, compliment the other CAD data exchange techniques references above. Thus, the BPF is a supplemental data representation of the exported feature in a situation where no fail occurred, and the fallback where a failure did occur.

In step 704, the feature from the export process is classified. In decision box 708, the classification of the brep is analyzed to determine if it is a single skin. If the brep is a single skin, then in step 712 an orphan of the skin is created using the orphan primitive, which is discussed above. In step 716, the orphan of the skin is sewn, using the sewing primitive, to the solid it operates on. The process continues to decision box 720 where a test is performed to determine whether the operation was successful, if it was, then a success is reported in step 764, if not, then an error is reported in step 768.

If the feature is not a single skin, then in decision box 728, a test is performed to determine whether the feature is a multi-skin. If the feature is a multi-skin, then in step 728 one or more orphans are created using the orphan primitive. In step 732, a multi-sew operation is performed on the skins. Alternatively, multiple single sewing primitives can be performed. The process continues to decision box 720, which is described above.

If the feature is not a single-skin or multi-skin, then in decision box 736, a test is performed to determine whether the feature is a solid. If the feature is a solid, then in step 740 an orphan is created, and in step 744 a Boolean operation is used to combine the orphan to the earlier object. Again, processing continues to step 720.

If the feature is not a solid, then in decision box 748, a test is performed to determine whether the feature is a multi-solid. If the feature is a multi-solid, then in step 752, an orphan is created, and in step 756, a Boolean operation is performed. (It is noted that this process is analogous to the multi-skin classification.) And again, processing continues to step 720.

If the feature was not a multi-solid, then in step 760 an error is reported and the process terminates.

It should be appreciated that the brep per feature methods and systems set forth above are computer implemented. As such, the methods can be distributed among multiple processors, or they can be broken up into component parts of an overall computer software product or system. In such an embodiment, the computer software product is typically embodied in executable object code, or interpreted source code, that is loaded from a persistent memory to a temporary memory just prior to execution by a processor.

According to one embodiment of the methods and systems described herein, there is a logical and physical partitioning between the export and import aspects of the systems. For instance, aspects of the computer software product can be a plug-in to an existing computer aided design system software that is resident on a first computer, such as all of the export methodologies, while other aspects are a plug-in to a second, differing computer aided design system software that is resident on a second computer. Furthermore, it is noted that common nomenclature for different operations is used. The objective of these operations is clear from the description provided, but it should be appreciated that different CAD systems may use different terminology or a slightly different technique (for example "sewing" may effectively be "patching" or "stitching" or some other function name in different CAD systems).

Furthermore, aspects of the methods and systems can be common to both the first and second computer. Or, in yet other embodiments, the computer software product embodying the methods can be combined into a single computer system acting in a client/server relationship with source and target CAD systems, or as middleware that bridges and/or manages the CAD data exchange processes between such CAD systems.

Complimentary Techniques

Above it is mentioned that the brep per feature and associated techniques and systems described herein can be independent and complementary of CAD data exchange techniques. Furthermore, in some circumstances, the brep per feature techniques can be strictly dependent upon the failure of some other export or import technique as a design model is extracted from a source CAD model and imported into a target CAD model.

While some of these techniques are described in earlier filed patent applications, which are incorporated herein by reference in their entirety above, certain subject matter is repeated again below, understanding now that these same steps can be complimented by the brep per feature techniques, or the brep per feature techniques can be used as a fallback mechanism in the event one of the earlier techniques fail.

Cad Data Exchange Failure

Figure 8:
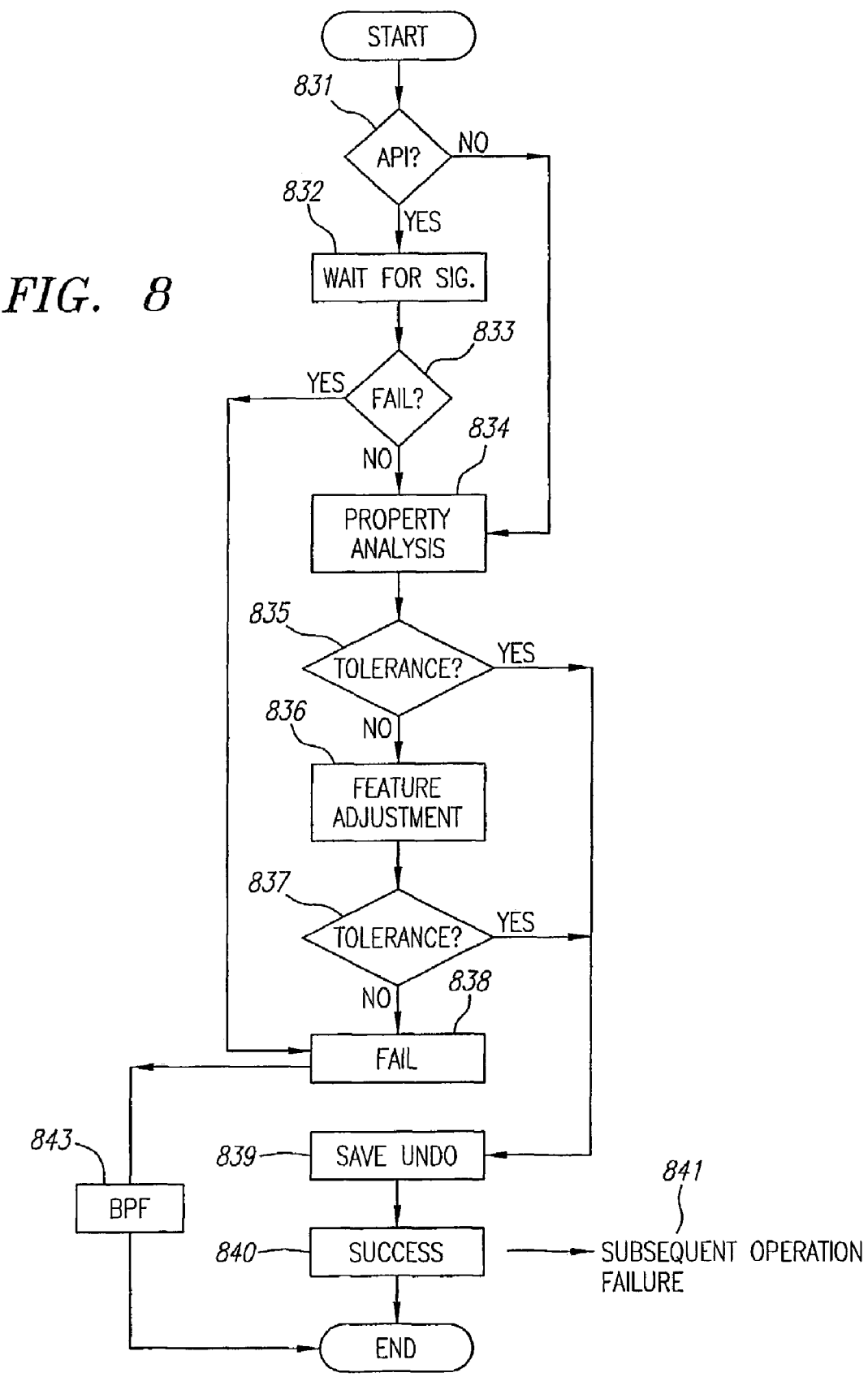
FIG. 8 is a flowchart detailing exemplary failure detection steps.

Turning to FIG. 8, it is a flow diagram that shows various CAD data exchange techniques and subsequent failures that can trigger the BPF techniques set forth above. It is again noted here that BPF is shown as a fallback mechanism, as the BPF is invoked after step 838 (likewise after step 841)—that is, when a failure occurs, at step 843.

In step 831, a test is shown that determines whether the failure detection is initialized based upon an API call, or some other operation (e.g., pattern matching, function mapping, user emulation, or brep). If the failure detection process follows an API call, then in step 832 the intermediary system waits for a signal back from the API that is indicative of success or failure of the API call. Otherwise, the process continues to step 834.

In step 833, a test is performed to determine whether the API failed. If the API did fail, then a fail signal is returned to the data exchange process in step 838 and BPF is invoked at step 843. If not, then step 834 is performed, which also follows step 831. In step 834, a physical and/or geometric property analysis is undertaken wherein geometric and/or physical properties of the source CAD model are compared with the target CAD model. For instance, a surface area calculation can be performed, a mass or density calculation can be performed, and/or a line or perimeter calculation can be performed. Other solid or geometric modeling calculations can be performed too.

In step 835, the result of the comparison in step 834 is tested against accepted tolerances associated with the target CAD system. It is worth noting that the tolerances can not only be with respect to the source and target CAD model properties, but also just the target CAD object properties with respect to design or feature tolerances corresponding strictly to the target CAD system. If the result is within the tolerance of the target CAD system, then the process continues to step 839, which is described below. Otherwise, the process continues to step 836, where the target feature is adjusted.

For instance, with respect to adjusting the target feature, if it is detected that two lines do not meet in the target CAD object, one or both of the two lines can be extended towards the other in an attempt to create an intersection between the two lines. In step 837, the tolerances can again be tested, as is described above. However, if the test fails, then a failure notification is returned to the data exchange process in step 838 and BPF is invoked at step 843.

If the test succeeds in step 837, then in step 839 undo information can be persistently stored in memory so that, if needed, the creation process can be undone. In practice, what is saved in the undo information is a synchronization point or marker for the source CAD model, as well as the corresponding operations for the target CAD model.

For example, assume a particular source CAD model has three features. When exchanging the source CAD model to the target CAD model, the first two features are successfully transferred, but the third fails. It is possible that the third feature exchange was not, in fact, a failure; rather the first or second feature exchange caused the third feature exchange to fail. In such a circumstance, when adjusting the particular target CAD feature (itself) does not successfully reproduce the source CAD feature and/or when the BPF technique fails, it is possible to back-out the second feature and then repeat the second feature exchange with a new technique. If adjusting the second feature exchange does not achieve a successful operation for the third feature exchange, then the first feature can be backed-out with the undo information.

In step 840, a "success" signal is returned to the main CAD data exchange process. While not an explicit step in the failure detection process, note 841 shows that a subsequent operation may identify a failure from a previous operation. In such an instance, the undo information saved in step 839 can be used to undo the previous operation—and any subsequent operations to the previous operation.

Pattern Matching

Figure 18:
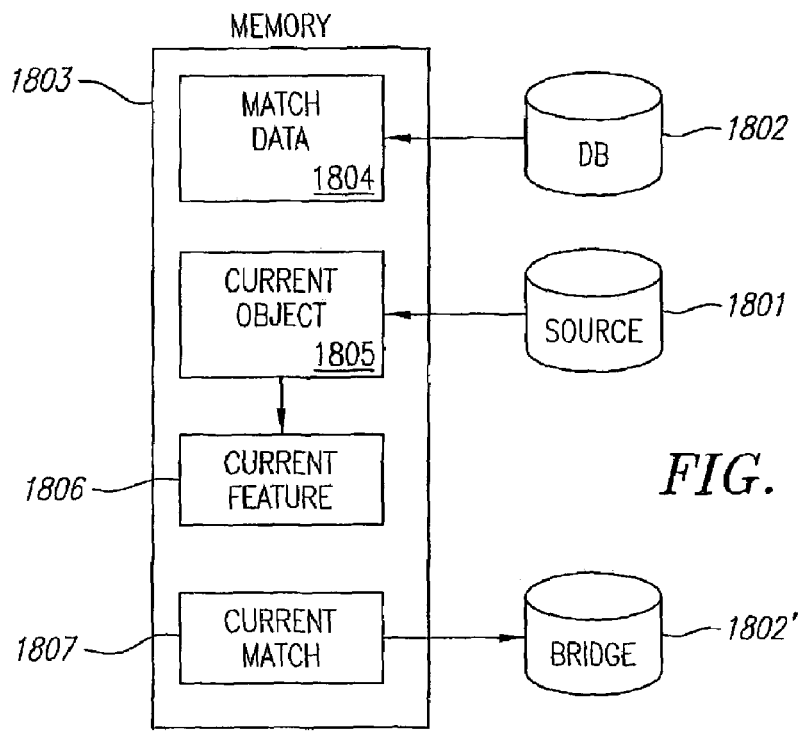
FIGS. 18-20 are diagrams corresponding to feature pattern matching. In particular.

Turning to FIG. 18, it depicts an operational overview of a pattern matching technique. A volatile memory region 1803 of a computer system holds portions of data from a persistent memory associated with, for instance, database 1802 and/or source CAD system 1801, which can partially reside on one or more persistent magnetic or optical storage devices.

The volatile memory region 1803 comprises four sections of memory. A match data region 1804 temporarily caches static match data that is part of the system knowledge base. The match data is a subset of the knowledge base that is a region of interest, or of higher statistical probability for finding a known pattern. A current object region 1805 temporarily caches one or more portions of a feature list from a source CAD system 1801—this cache generally represents a set of data (or operations) that is sufficiently proportioned so that it is large enough to hold the largest source operation pattern.

Regions 1804 and 1805 are used primarily to reduce I/O and associated disk access latencies. The regions can be of variable size, and, according to one embodiment, the memory 1803 can further include a hash or index to expedite searches in larger record sets, or at least record sets that are beyond the bounds of the data stored in memory 1803.

A current feature region 1806 is smaller than the match data region 1801. The current feature region 1806 holds the source operation, drawn from the current object region 1805 that is the basis of a query of the match data region 1801.

The current match region 1807 temporarily stores match data records, i.e., information from the records of the knowledge base 1802 that indicate how the target CAD system is to construct the target CAD model—or the target feature. The current match region 1807 can be small, but if it is small, then the region should be frequently written to a persistent memory region and then flushed. Of course, if the region is large, the same is true, but the frequency could be decreased.

Although optional, a bridge or temporary structure 1802' is shown in FIG. 18. The bridge structure 1802' can be similar or equivalent to the UPR described above with reference to FIG. 4 (element 451). Thus, the bridge structure 1802' can include additional information concerning the source CAD model, the target CAD model, and extraction and creation information that can be used for a lossless, two-way data exchange. For example, it may include a data dictionary with redo or undo information, feature and/or representation associations, sequence or order of operation information, and other system information.

Figure 19:
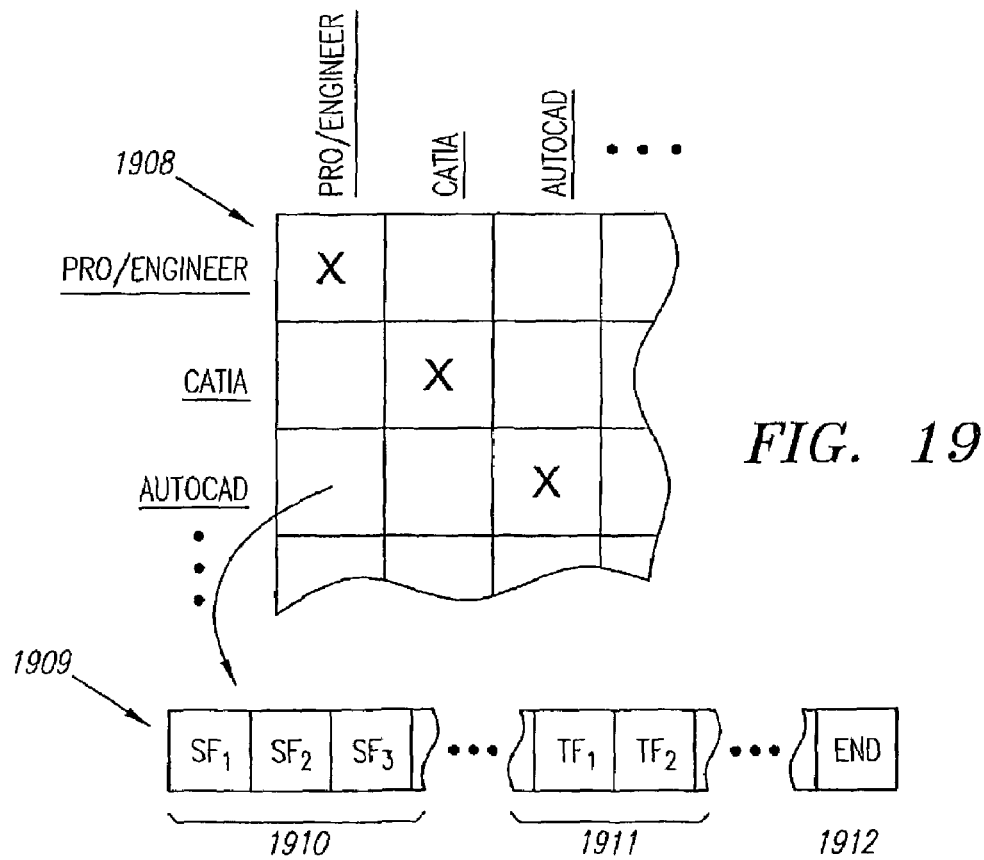

FIG. 19 depicts exemplary data structures for the knowledge base embodied in database 1802. According to one embodiment, the data structure comprises a conversion table 1908 having a source CAD system type and a target CAD system type. Matching the source and target CAD system types, a computer executing the steps of the invention can access a pointer to additional records or data structures that correspond to the particular CAD data exchange desired. While X's are shown for conversions of similar CAD types, the methods of the invention are equally applicable to conversions of CAD models of similar types, but having different versions. Thus, converting a CAD model from a ProEngineer Version 2000i2 to a ProEngineer Version 2000i, i.e., a backward conversion, is possible, as is a forward conversion (2000i to 2000i2). Pointers to match data records for the various version numbers can be included in the structure too.

According to another embodiment, a conversion table 1908 is not necessary. For instance, the CAD data exchange software is typically embodied in a plug-in to a third-party CAD system. The plug-in can be conversion specific, meaning that the plug in only converts files of type A to files of type B (and vice versa). In such an instance, the conversion table 1908 information is already known, thus the table 1908 is not necessary.

In an aspect of the pattern matching technique, match data records 1909 are used to effectuate the pattern (or even the function) matching process. The match data records 1909 include two areas. The first area 1910 stores source function or operation information. The source function information corresponds to one or more operations or geometric structures in the source CAD system. The second area 1911 stores target function information or geometric structures for the target CAD system—for instance, a pointer to a function that does the desired action. The target function information corresponds to one or more operations in the target CAD system—for instance, the target function information can include a function or pointer to a function for the API technique 436. An end of file area 1912 can also be included so that match data records 1909 are easily identifiable from one another, as it is possible that the records have a variable length. However, if fixed length match data records 1909 are used, then the end of file area 1912 is unnecessary.

Additional data structures can also be included. For instance, as was mentioned above with reference to FIG. 18, the match data records 1909 can be broken into various hash buckets by using known hashing techniques, or a B-tree or other type of indexing structure can be used to expedite search operations. Moreover, it can be efficient to sort the match data records 1909 prior to run-time or once the records have been updated. If the records are sorted then regions of memory with a high locality of reference (meaning that if a memory address X is called, then memory address Y is likely to be called too) can be grouped together, thereby reducing I/O and read latencies.

Figure 20:
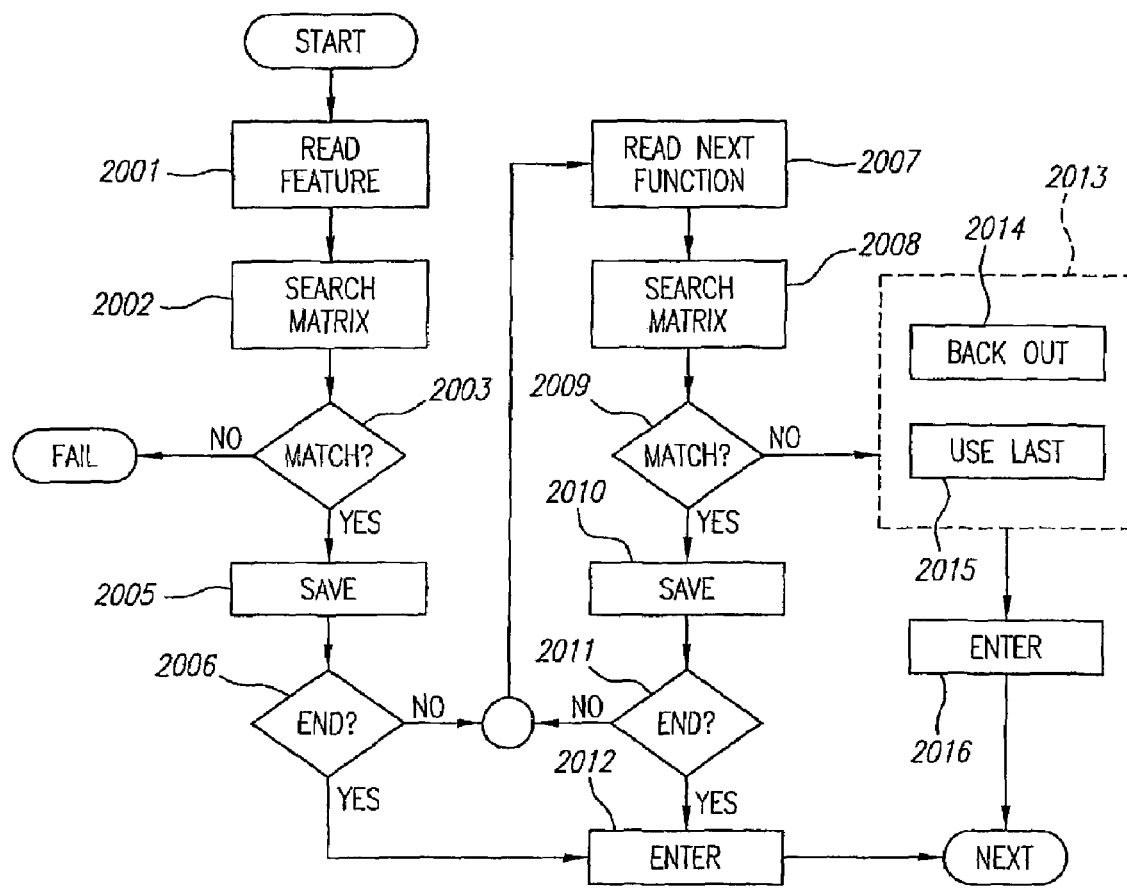

FIG. 20 is a flowchart detailing a method for pattern matching as applied to CAD data exchange. It is convenient, but not necessary, to review FIG. 20 with reference to FIGS. 18 and 19. For purposes of this explanation, it will be assumed that the relevant portions of the source CAD model 1801 and the knowledge base 1802 have been read into memory 1803.

In step 2001, a current feature from the source feature list is read and loaded into a the current feature region 1806. In step 2002, the data in the current feature region 1806 is compared against source functions 1910 in the match data region 1801 by searching the region 1806 for a matching data record. In step 2003, if a match was found, then the process continues to step 2005, otherwise a fail signal is returned to the main CAD data exchange algorithm.

In step 2005, information corresponding to the current match data record 1909 is saved in the current-match region 1807. The information can be current match record 1909 itself, a pointer the current match record 1909 in the knowledge base 1802 or match data region 1801, the target functions 1911, or the target functions 1911 translated with any supporting data (e.g., parameters for the target CAD system, and/or additional information concerning the extraction or creation process).

In step 2006, a test is performed to ensure that there are no additional functions in the source feature that need to be exchanged. If additional functions need to be processed, then the method continues to step 2007. Otherwise, in step 2012 the current match record 1909 can be persistently saved (if not already) and the next function corresponding to the feature can be loaded in step 2007 such that the search (2008) and match (2009) steps can be performed.

In step 2009, it is possible the additional function(s) added to the search created an incompatible match. In step 2013, this scenario is handled. According to one embodiment, any changes made or added to the target feature list are backed-out on feature by feature basis (step 2014). One reason this process may be implemented is that a subsequent attempt to handle the failed operation(s) may more efficiently model a series of operations (e.g., an entire feature) rather than a single operation. In another embodiment, the last saved match data record is used as the basis for the target feature list (step 2015), and the remaining functions can be exchanged with the target CAD system via an alternative method. In step 2016, the match data record information is entered for the target CAD model.

Returning to step 2009, if a match is found, then in step 2010 information corresponding to the match data record 1909 is saved. If there are more operations in the source CAD model at step 2011, then processing returns to step 2007. Otherwise, the saved target function list, which can comprise multiple sets of information corresponding to target functions 1911, is entered into the target CAD model in step 2012.

It is worth noting that while the pattern matching process described above is defined with reference to a particular feature, which is the preferred embodiment, it, is possible to perform the pattern matching with respect to individual functions without regard to their overall relationship to a particular feature.

According to one embodiment, after a particular feature is created using the pattern matching technique, then a physical and/or geometric property analysis (as is discussed above) is performed on the target feature and the properties are compared against physical/geometric properties of the source feature. If the properties do not match, then the parameters of the target feature list can be adjusted until the properties are within an acceptable tolerance.

User Emulation

Figure 9A:
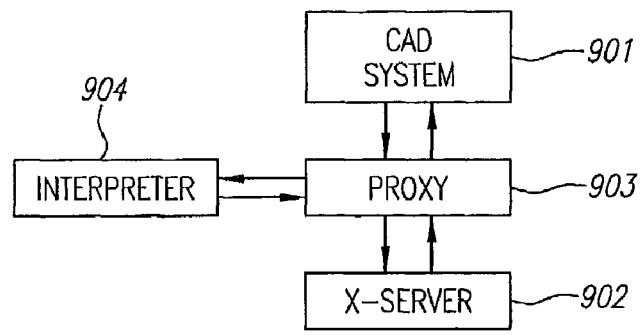
FIGS. 9A-C and 10A-D are diagrams corresponding to user emulation. In particular.
Figure 9B:
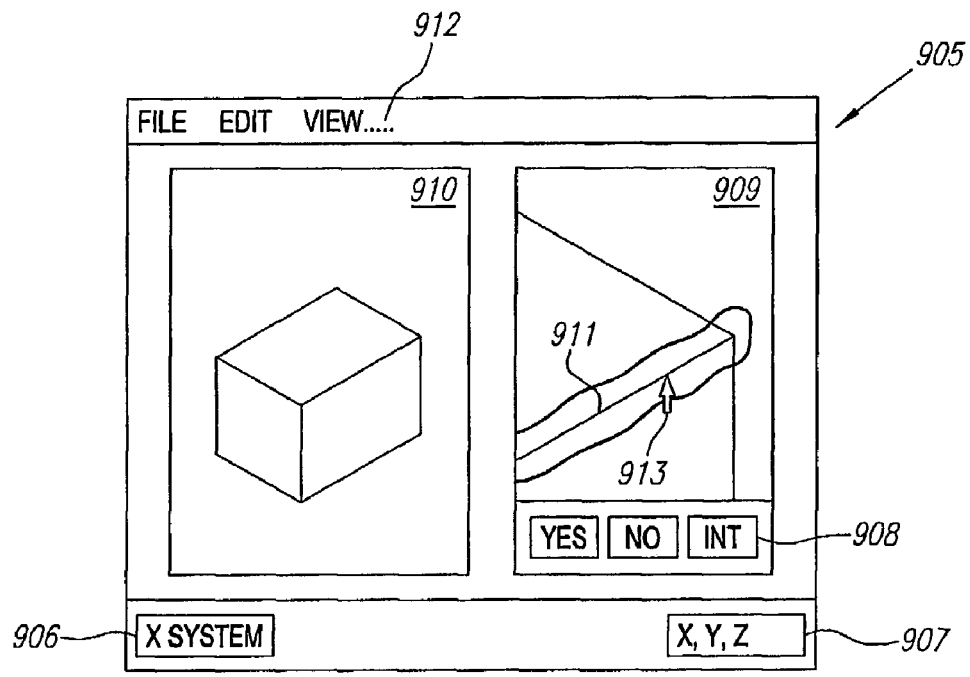
Figure 9C:
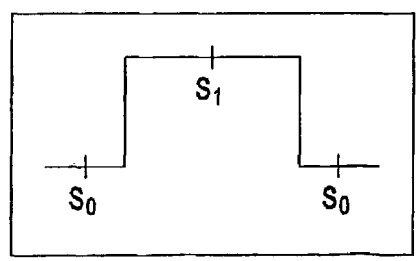

FIGS. 9A-C depict aspects of user emulation, which is a fallback or alternative technique used to perform the extraction and creation processes. According to one embodiment, the user emulation techniques are used to directly exchange data from the source CAD system to the target CAD system. Alternatively, the user emulation techniques can be used to exchange data from the source CAD system to the target CAD system through an intermediate file, such as the bridge data structure. In still another embodiment, the user emulation techniques are used to gather information on either the source CAD model or the target CAD model.

For instance, the user emulation techniques described below can be used to collect attributes or callout information corresponding to a source or target feature, to perform geometric or physical property analyses, or to select a particular edge or face on the source or target CAD model.

In still other embodiment, the user emulation techniques can be used to automate a process with a known user interface behavior.

Turning to FIG. 9A, it is an architectural overview of an embodiment of the user emulation techniques. The figure is useful in understanding how the different software modules of a programmed computer interact.

CAD system software 901 includes a user interface. The user interface typically interacts with a user through a pointing device, such as a mouse, or keyboard controls. For purposes of this explanation, the mouse and keyboard controls will be called "interface inputs". In fact, however, the user interface does not directly interact with the interface inputs. In practice, interface inputs are passed through a device driver (not shown) and presented on a computer monitor (not shown). At the same time, information corresponding to the interface inputs are passed through, for instance, an X-server 902 to the CAD system 901. The user interface of the CAD system 901 in turn can respond to the interface inputs by sending data or commands back through the X-server 902, which are then output to the computer monitor.

It is noted that an X-server is only an exemplary graphical windowing module. Under certain operating systems, the role of the X-server is performed by other graphic images servers or modules. These modules can include, for instance, the USER.EXE and GDI.EXE executables in Microsoft Windows NT. In other environments additional executed or interpreted modules, such as interfaces created in Java Script or using various Java classes, could perform a similar functionality for the application or operating environment.

For example, a user may move a cursor (with a mouse) from position (x1, y1) to (x2, y2) and then performs a mouse click. The mouse sends the interface inputs to a device driver, which translates the movement into electrical signals. The interface inputs are sent to the X-server 902, which controls a bitmap display for the monitor. Electrical signals are also sent to the CAD system 901. The CAD system 901 receives the interface inputs and determines how the CAD software should respond (or change) to the interface inputs. The response can include changing the color of a particular menu item, presenting menu pull-down list, or selecting a feature of a particular object. Once the CAD system 901 determines how the display should change, the CAD software makes the corresponding state change internally and then sends additional information back to the X-server 902 so that the computer display can be changed appropriately.

According to an embodiment, the user interface does not interact with the X-server 902 directly. Instead, the user interface interacts with one or more software modules, at least one of which is emulating a user. A proxy 903 acts as a buffer between the CAD system 901 (and its user interface) and the X-server 902. Signals passing through the proxy 903 are passed off to an interpreter 904, which examines the signals and emulates a user response. The emulated user response can be sent back through the proxy 903 to the user interface or to the X-server 902. (It is worth noting that the proxy 903 and the interpreter 904 can be resident in a single software module, for instance a plug-in that is coupled through the CAD system 901.)

In an alternative embodiment, data and control signals between X-server 902 and the CAD system 901 can be captured by a plug-in to the CAD software. In responding to the captured signals, the plug-in can enter a state that is essentially a time delay. A second, sub-thread can then be spawned by the plug-in that processes the captured signals. Once the plug-in has processed the signals, it can store state information (in reserved memory associated with the plug-in) corresponding to the CAD system and signal the plug-in to terminate the wait state.

Meanwhile, the CAD system returns to normal processing under the assumption that the plug-in has terminated. The next time the signals are captured by the plug-in, the plug-in can again instruct the CAD system to invoke the plug-in and then resume processing in the sub-thread—picking up the process where it left off. While this technique may not be thread safe, it is a useful method for executing two processes that are, in a normal operating environment, mutually exclusive.

According to one embodiment, before terminating the plug-in, the sub-thread initializes a timer. The timer can be used to detect when an external processing error occurs. If the timer expires before processing the state information by the sub-thread is resumed, then an error message can be returned so that the user emulation process can be canceled or backed-out.

According to an embodiment, the underlying CAD system, C library implementation, or platform does not allow safe cross-thread calls. To work around this prohibition, when the sub-thread needs to directly call the CAD) system API, the sub-thread uses inter-process communication, remote procedure calls, or cross-thread messaging techniques to pass a request to the plug-in to perform the call on the sub-thread's behalf.

FIG. 9B is a screen shot 905 detailing aspects of a selecting an object, which is one useful process to which the user emulation techniques can be applied. In an environment, the screen includes a tool bar 912, which has text based menu options, a major view 910 of the object (here a cube), and a zoomed view 909 of a portion of the object. The zoomed view 909 further includes a button bar 908, which has mouse selectable options that are typically used for specifying to the CAD system whether a particular feature of the object has been selected. Also shown in the screen shot 905 is a status indicator 906 and a coordinate indicator 907, the coordinate indicator 907 showing a present position of the cursor 913. A graphic element, here an edge 911, of the object is shown highlighted. (As used herein, the term "graphic element" refers to a line, edge, face, surface, or other graphical design feature of the CAD object—usually in two- or three-dimensional form, that is presented for a computer display.)

FIG. 9C is a diagram of an exemplary signal from the X-server 902. In this instance, the signal can be a color indicator for a particular graphical element shown in the windowing system. According to an embodiment, an act of selecting a graphical element on the object involves monitoring one or more signals from the X-server 902 for a state transition in a color indictor associated with one of the buttons in the button bar 908, or the status indicator 906. Detecting the state transition of an indicator can implicitly indicate that a user emulation process did not fail.

For instance, the X-window text in the status indicator 906 may change colors depending on whether the system is waiting for a user response or processing a previous response. Another option is to scan text for dialogue boxes or pop-up windows for words indicative of a failure or success of a previous operation.

FIGS. 10A-D are flowcharts detailing steps for the user emulation techniques. The user emulation techniques are typically performed by the interpreter 904 in combination with other elements of a computer system.

Figures 10A, 10B:
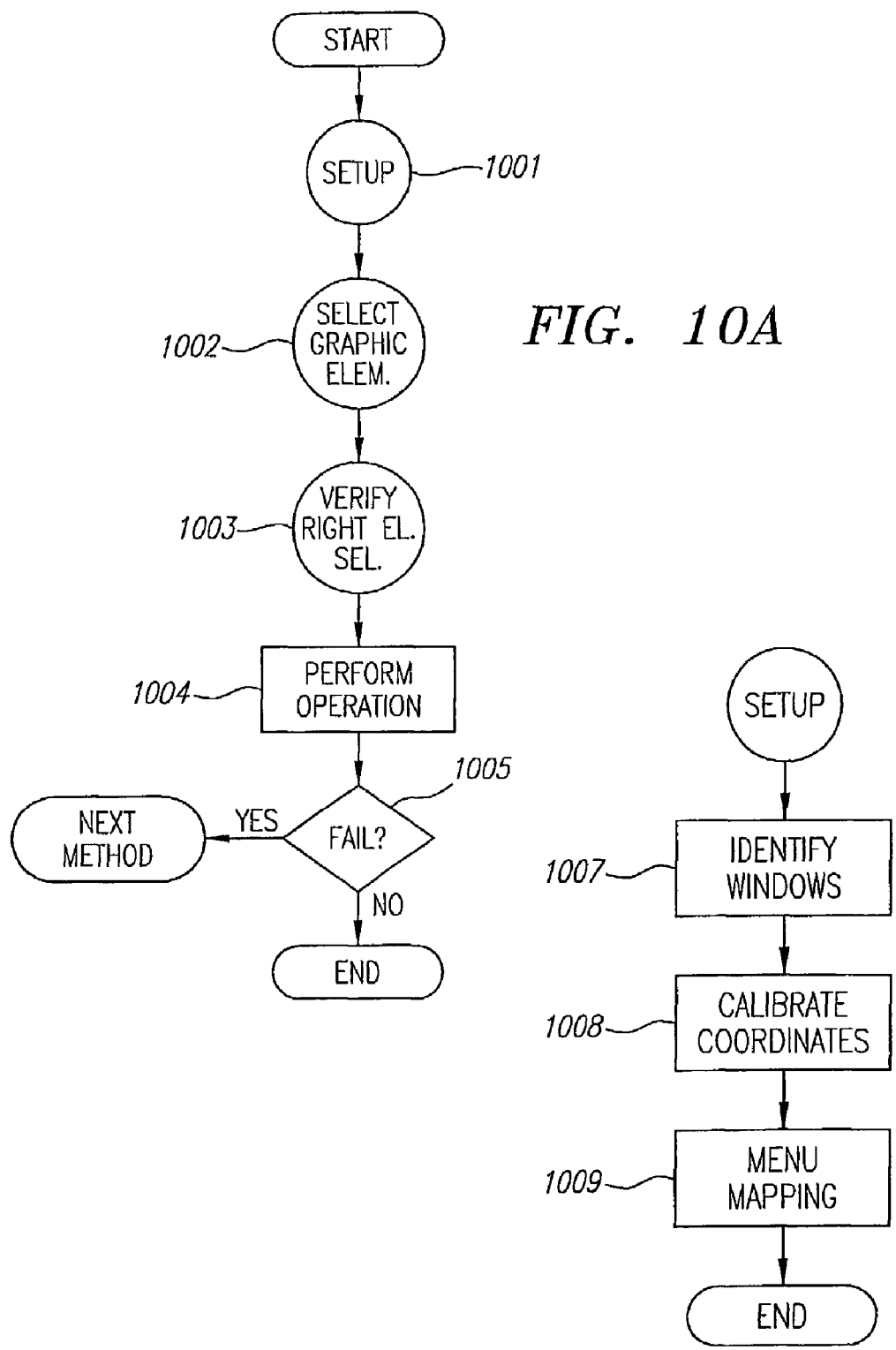

Turning first to FIG. 10A, it depicts the primary steps for user emulation. In step 1001, setup operations are performed so that the interpreter 904 can be calibrated to the windowing system. In step 1002, a graphic element shown in windowing system is selected.

In step 1003, a test is performed to verify that the correct (or desired) graphic element is selected. For instances, selecting and verifying the graphic element can involve stepping through a feature list in a CAD model and monitoring a signal from the X-server 902. Alternatively, emulated mouse movements and clicks can be sent to the X-server 902 and the resulting status signals returned to the CAD system 901 can be monitored for state transitions, or text strings.

Once the correct graphic element is selected, then an operation is performed on the graphic element in step 1004. The operation can be performing a property analysis, reading attributes corresponding to the graphic element, hiding or suppressing the graphic element, initiating an export command (e.g. creating a brep), or modifying attributes corresponding to the graphic element. In step 1005, a test is performed to determine whether the operation failed. If the operation failed, then the next CAD data exchange method is attempted, otherwise the exchange method can be considered successful.

FIG. 10B is a flowchart depicting steps for performing the setup operations. In step 1007, the windows shown in the display device are identified. Window identification is based on any or all of the following, depending on the specific CAD system involved: (1) the window hierarchy (e.g., the number of child windows, the position of the various windows in the window list); (2) any text string displayed in the windows; and/or (3) the geometry of the windows (e.g., their width, height, ratio of width to height, position on the screen). The windows can be stored in memory with identifiers selected by the CAD data exchange software, or they can be stored with identifiers corresponding to text associated with the window (e.g., a title or header). Next, in step 1008, signals corresponding to movements of the cursor (e.g. 913) are calibrated to the coordinates of the windowing system (e.g. 907). The calibration is saved in memory so that adjustments or translations can be made to signals generated by the interpreter so that the signals are tuned (e.g. scaled) to the particular windowing environment and pointing device settings.

In step 1009, a menu mapping is performed. Generally, the menu mapping involves reading the text of the main tool bar 912 options, sending a mouse click to each option and further mapping the sub-options. The results of the mapping are also stored in memory so that they can be aligned with future operations that are to be performed, such as if user emulation is used as part of the pattern matching techniques. The menu mapping can also be used to verify the (national) language or version of the CAD software.

Figure 10C:
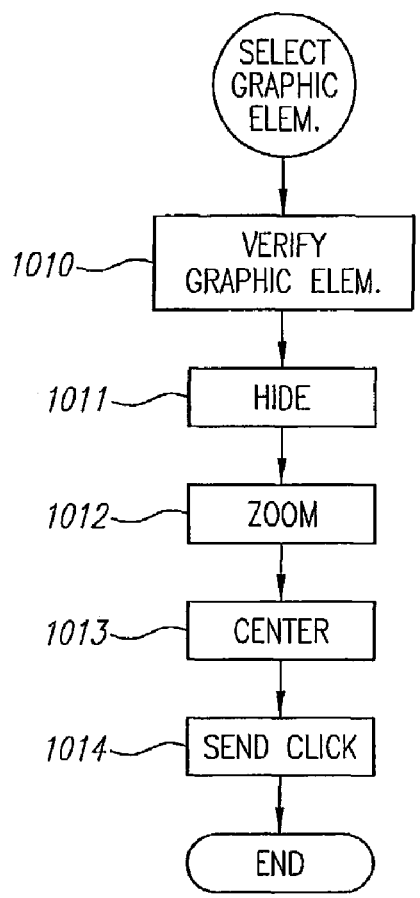

FIG. 10C is a flowchart depicting steps for selecting a graphic element. The steps are particularly related to selecting a feature or aspect of an object presented in a window, rather than an option from main tool bar 912 or one of its sub-options.

In step 1010, a test is performed to verify that the graphic element is visible in the target window. If the graphic element is not in the target window, then the window positioning or vantage point can be adjusted, for instance by using the main tool bar 912. In step 1011, one or more features other than the desired feature (e.g. those features directly adjacent to or near the desired feature) are hidden or suppressed. In an alternative embodiment, the one or more features are deleted, but only where they can be recovered later. Next, in step 1012, a region of the target window is zoomed out (making the object smaller), and in step 1013, the window is centered about the target graphic element. In step 1014, a mouse click is sent to the center of the target window.

Figure 10D:
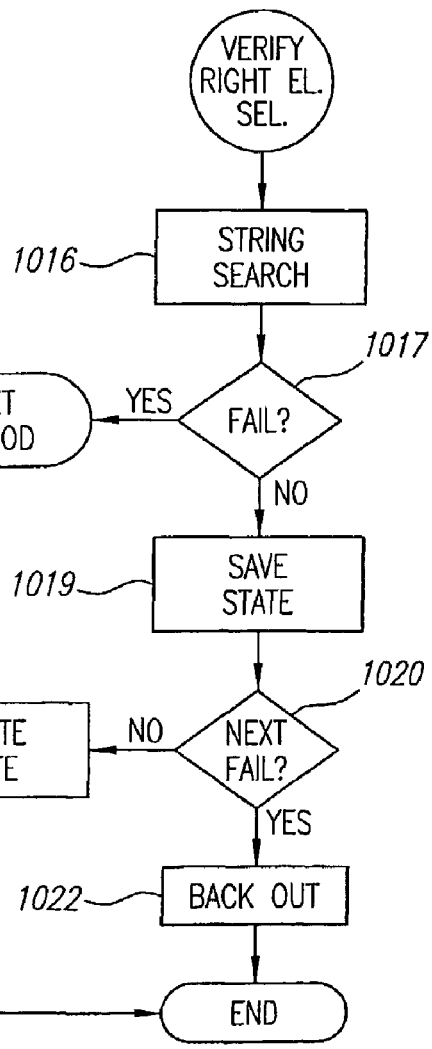

Turning to FIG. 10D, it is a flowchart depicting a technique for verifying that the right element is selected. In step 1016, a return string or state indicator from the X-server 902 is checked to verify that the correct graphic element was selected. According to one embodiment, if the correct graphic element, or any selection was not detected, then the process continues to step 1012 (or step 1002) so that the target window can be re-centered about another point and/or the zoom factor can be decreased (making the object larger):

However, as is depicted in step 1017, if a failure is detected, then user emulation is canceled and processing continues to the next CAD data exchange technique. If a failure is not detected, then state information corresponding to the CAD object prior to any changes made by the user emulation process is persistently saved in step 1019.

Step 1020 shows a test for a failure of a subsequent operation, for instance in an operation that occurred outside of a user emulation technique—an API, a pattern matching, a later user emulation, or a brep process—when handling the CAD data object. If the subsequent operation failed, then it is possible that the user emulation from the previous operation was in fact a failure even though no immediate failure was detected (e.g. from a property analysis). Thus, in step 1022, the state information stored in step 1019 is backed out (e.g. a rollback process) from the CAD data model. If the subsequent operation did not fail, then in step 1021 the state information is deleted.

Edge Selection

Part of the CAD, data exchange process can involve performing operations that require identification of some part or feature of a defined CAD model. To this end, the edge selection techniques described below provide a new and useful tool that can be used when performing such operations—the techniques are used for the purpose of correlating source edges to target edges in a plurality of computer aided design systems. For instance, the operations can include a round or chamfer operation on a target CAD model, or selecting a face of an object. The process can be a stand-alone process, the process can integrate steps from the user emulation process (described above), or the process can be integrated into the user emulation process. Furthermore, it is noted that in the accompanying figures and description, abstractions of lines and shapes are used, as they might appear to they eye, even though what is actually operated on and used in the techniques are data representations of lines and shapes.

Figure 11A:
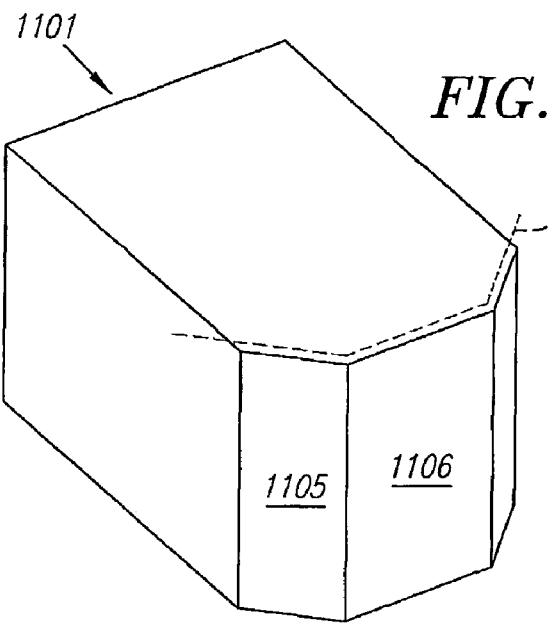
FIGS. 11A-D and 12-17 depict edge selection techniques. In particular.
Figure 11B:
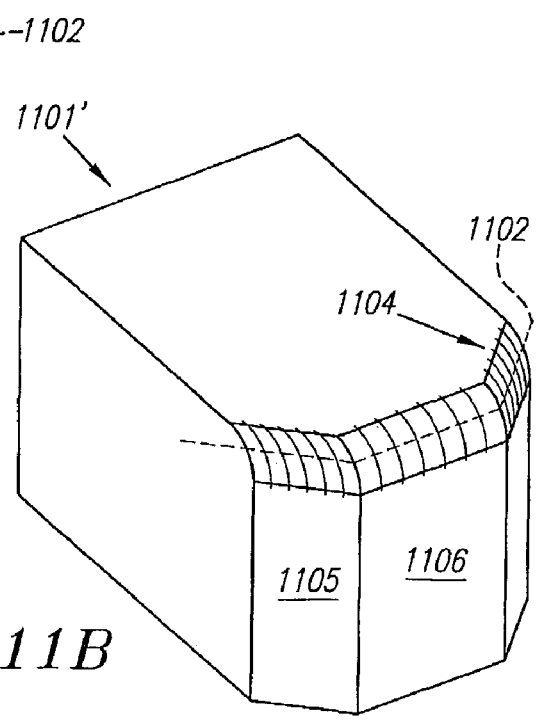

FIGS. 11A-D illustrate the current problem. FIG. 11A depicts a 3-dimensional object 1101 in a source CAD system. The object has a somewhat rounded side that is represented by four faces (only face 1105 and 1106 are called out). An edge 1102 represents a curve formed by the four faces. A round operation is specified in the source CAD model, the operation being performed on the edge 1102. Referring to FIG. 11B, when the round operation is performed, a rounded edge 1104 is formed where the edge 1102 once existed. The object 1101 is now shown as object 1101'.

Figure 11C:
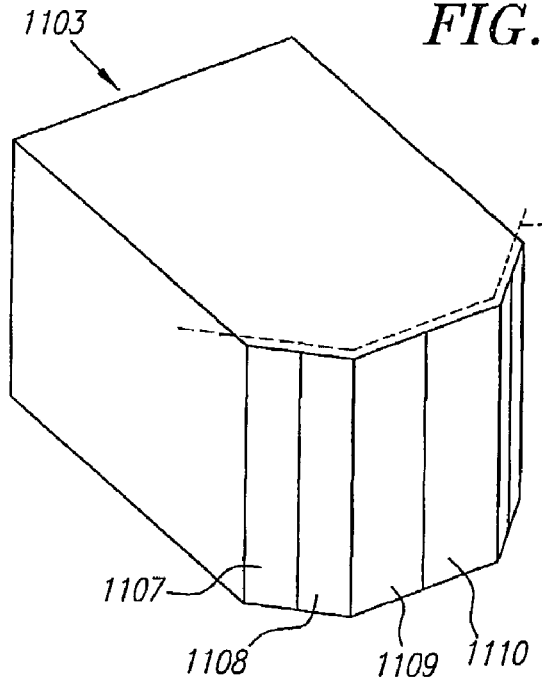
Figure 11D:
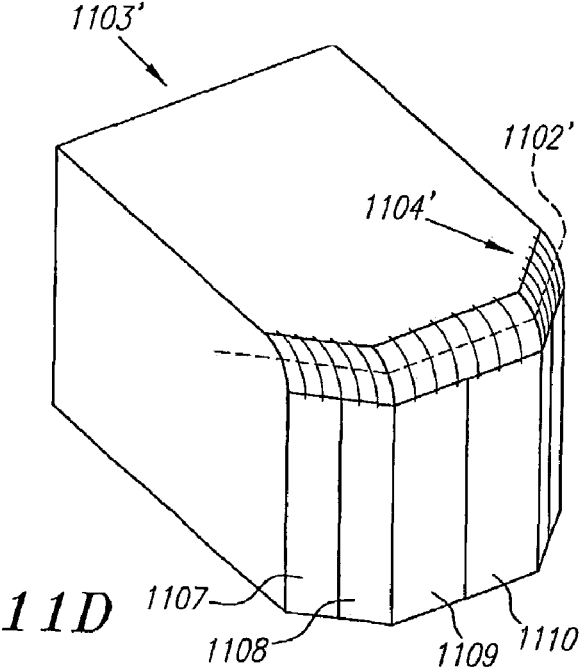

As is mentioned above, an underlying object of the CAD data exchange techniques is that the design intent from the source CAD model is preserved in the target CAD model. Accordingly, in some instances, finer granularity representations of source CAD model are often found in target CAD models, while in other circumstances, the opposite relationship exists. FIGS. 11C-D show such a finer granularity representation of the source CAD model as embodied in the target CAD system. For instance, in object 1103, the four faces that comprise edge 1102 in object 1101, now consist of eight faces, which include faces 1107, 1108, 1109 and 1110 and now make edge 1102'. What is desired is to correlate the edge 1102 with the edge 1102' so that the feature 1104 can be created in the target CAD system as feature 1104'.

Figure 12:
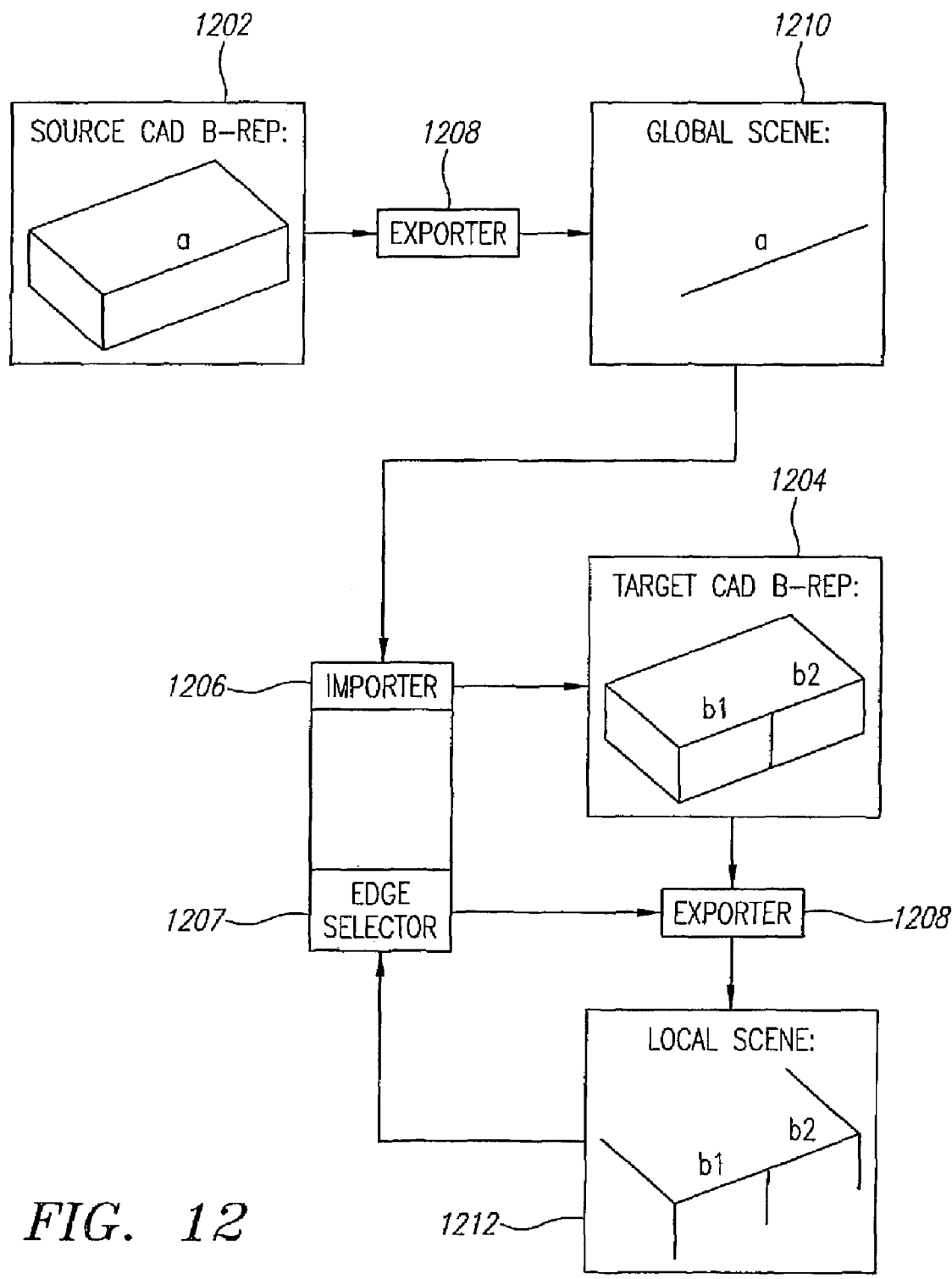

FIG. 12 depicts an operational overview of the edge selection algorithm. An object (e.g., a boundary representation of a block) exists in the source CAD system 1202, the object having an edge "a". Edge "a" is exported to a global scene 1210 for the data exchange product by an exporter module 1208. Once the edge "a" has been identified in the global scene 1210, the importer module 1206 must now identify the corresponding edge in the target CAD system 1204. A local scene 1212 is then exported from the target CAD system, the local scene representing a plurality of candidate "edges" that may match edge "a". It is noted here that the local scene 1212 is exported in an incremental manner. While it is possible that the entire local scene 1212 may be exported at once, generally, this is not the case, which is noted by the circular data flow noted in FIG. 12.

Once the local scene 1212 (or a portion thereof) is exported, then the edge selector module 1207 begins the correlation process. Edges in the target CAD system 1204 that are unnecessary are removed from candidacy, while a mapping is maintained of the others, the mapping ideally representing an n:m, where n is greater than or equal to m, correspondence between the target CAD system 1204 edges and the source CAD system 1202 edges. Since the mapping is maintained, subsequent operations on edge "a" can be identified as applying to edges "b1" and "b2". Following are multiple techniques that can be used independently or in combination for selecting an edge.

Edge Overlap Algorithm

The underlying premise of the edge overlap algorithm is that two edges (i.e., from a source CAD model and a target CAD model—the global and local scene) overlap if their intersection is topologically one dimensional ("1-D"). If the two edges overlap, then they lie on the same geometric carrier.

In one embodiment, the geometry of an edge is represented as a non-uniform rational B-spline ("NURBS"). Making a NURBS representation of the geometry of the edge gives each edge a start-point and an end-point. If the edge is closed (i.e., a circle) then the start-point and end-point coincide. While start-points and end-points are used according to one embodiment, it is also acceptable to use start- and end-vertices. Other embodiments of the invention are envisioned, thus another representation of an edge can also be discrete linear segments with corresponding Cartesian coordinates.

Figure 13:
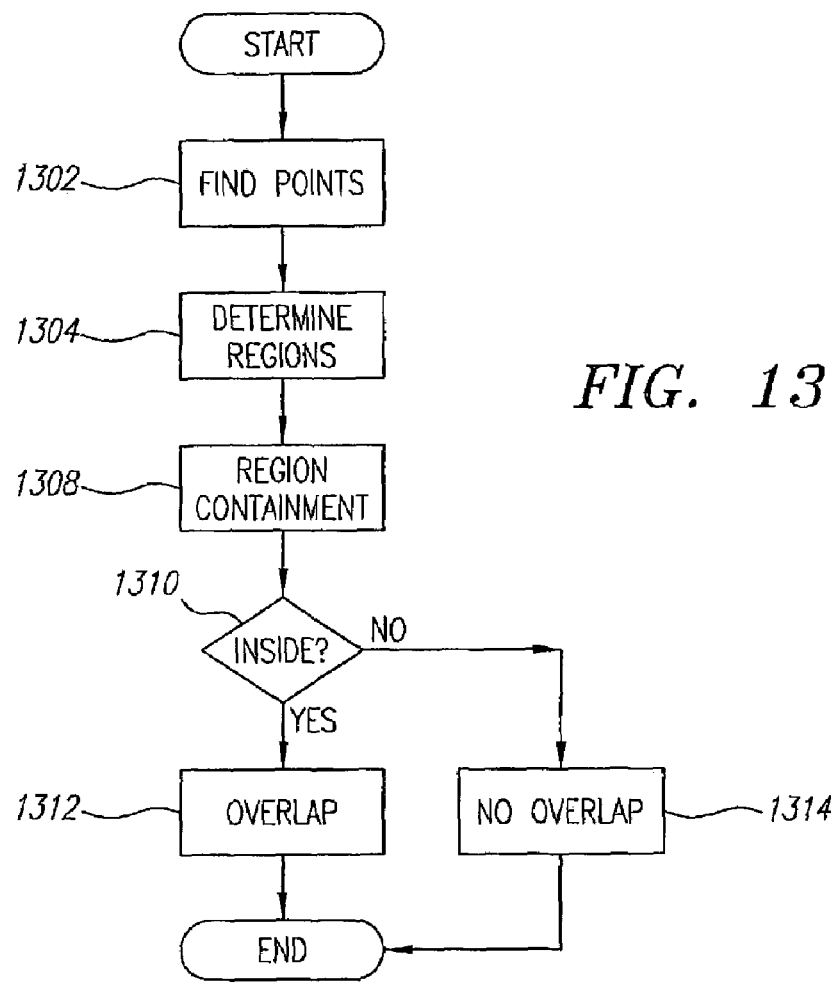

Turning to FIG. 13, it is a flowchart depicting the edge overlap algorithm. In step 1302, the start- and end-points of the NURBS representing each edge are extracted from the NURBS.

In step 1304, regions are determined in, for instance, the source edge. The regions represent the number of times the source edge is divided if the target edge start- and end-points are mapped onto it. Thus, if a single point in the target edge is found in the source edge, then the source edge has two regions. However, if two points in the target edge are found in the source edge, then the source edge has three regions.

It is useful in step 1304 to sort the extracted points—the regions of the source edge are between every consecutive pair of distinct (sorted) points.

Figure 14:
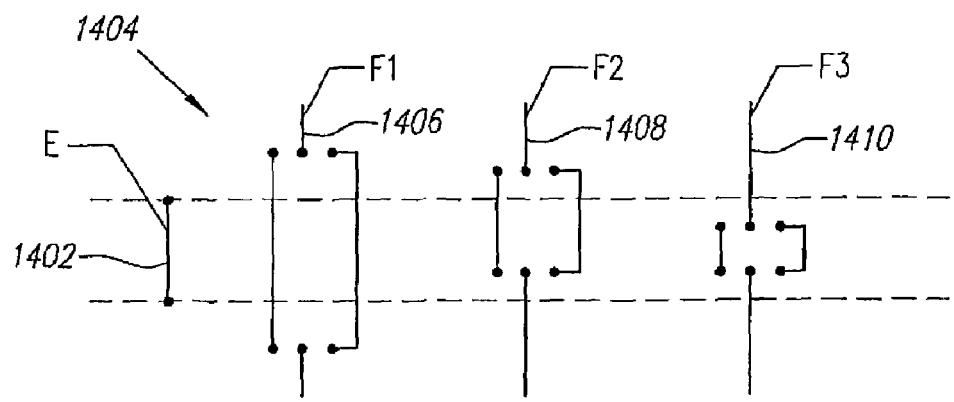

FIG. 14 illustrates an example of determining regions of a source edge. A source edge "E" (1402) and three candidates 1404 for target edges "F1" (1406), "F2" (1408), and "F3" (1410) are depicted. Determining the regions of source edge E vis-a-vis the various target edge candidates 1404: E has one region with respect to F1; E has two regions with respect to F2; and E has 3 regions with respect to F3. When identifying the regions, it is noted that the source edge always has at least one region but no more than three regions.

Returning to FIG. 13, in step 1308, a region containment operation is performed. The region containment algorithm, of which step 1308 is a part, assumes that the source edge and the target edge have the same geometric carrier. The region containment operation selects the midpoint of a region defined by the source edge. In step 1310, a test is performed to determine whether the selected midpoint is within the target edge. In step 1312, if the selected midpoint is within the target edge, then the source and target edges are said to overlap and the result is returned. If the midpoint is not within the target edge, then no overlap is assumed to exist, an appropriate response is returned in step 1314.

It is noted that the above process does not require laser-like precision. It is appreciated by the inventors that different CAD systems may represent a non-linear segment in different ways. It is not the objective of the CAD data exchange system to re-create source CAD models exactly the same way in a target CAD model—that is, with the same underlying know-how. Rather, it is the objective to create an acceptable target CAD model that respects the know-how of the source and target CAD systems. Thus, tolerance in determining whether a particular point on the source edge or target edge lies in the other is designed into the analysis. Accordingly, mathematical or statistical analyses can be used to model such a tolerance, or the tolerance can be hard-coded into the CAD data exchange system.

Edge Containment Algorithm

While the granularity of the target CAD model is ideally the same or finer than the source CAD model, it is possible that the target CAD model represents a particular edge in a manner that is more efficient than the source CAD model. In such a circumstance it is useful to perform an edge containment algorithm (as opposed to the region containment operations) to verify that all of the regions of the source edge are contained in the target edge. It is further noted that this process can be used to verify the overlap of two edges even though the target edge is represented in a finer granularity than the source edge.

As was the case with the edge overlap example, the source and target edges can be utilized from the global and local scenes (depicted in FIG. 12). Depending on the verification desired (i.e., the target edge has more representative regions than the source edge or vice-versa), the input to the edge containment algorithm can be selected according to the desired output. Furthermore, the edge containment algorithm can be used in conjunction with the edge overlap algorithm, which is described above.

Here, for the purpose of explanation, it is assumed that the target edge has more representative regions than the source edge, as was the case above with reference to FIGS. 11A-D. Additionally, when a set of target edges overlap with a source edge "e", this set of target edges will be referred to as a "connected" set. Furthermore, a sequence of oriented edges, such that the end-point of each oriented edge is the starting point of its successor, will be referred to as a "chain".

Figure 15:
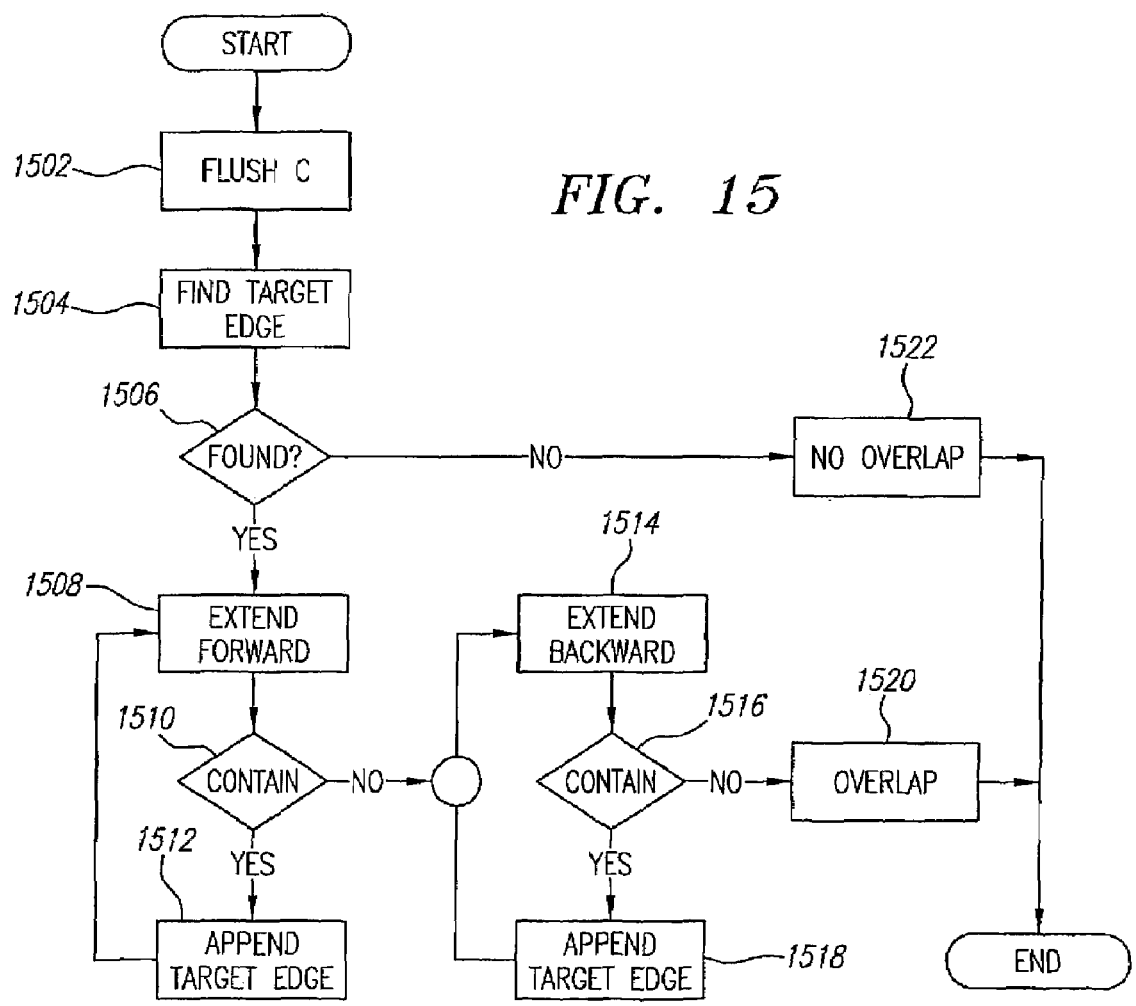
Figure 16:
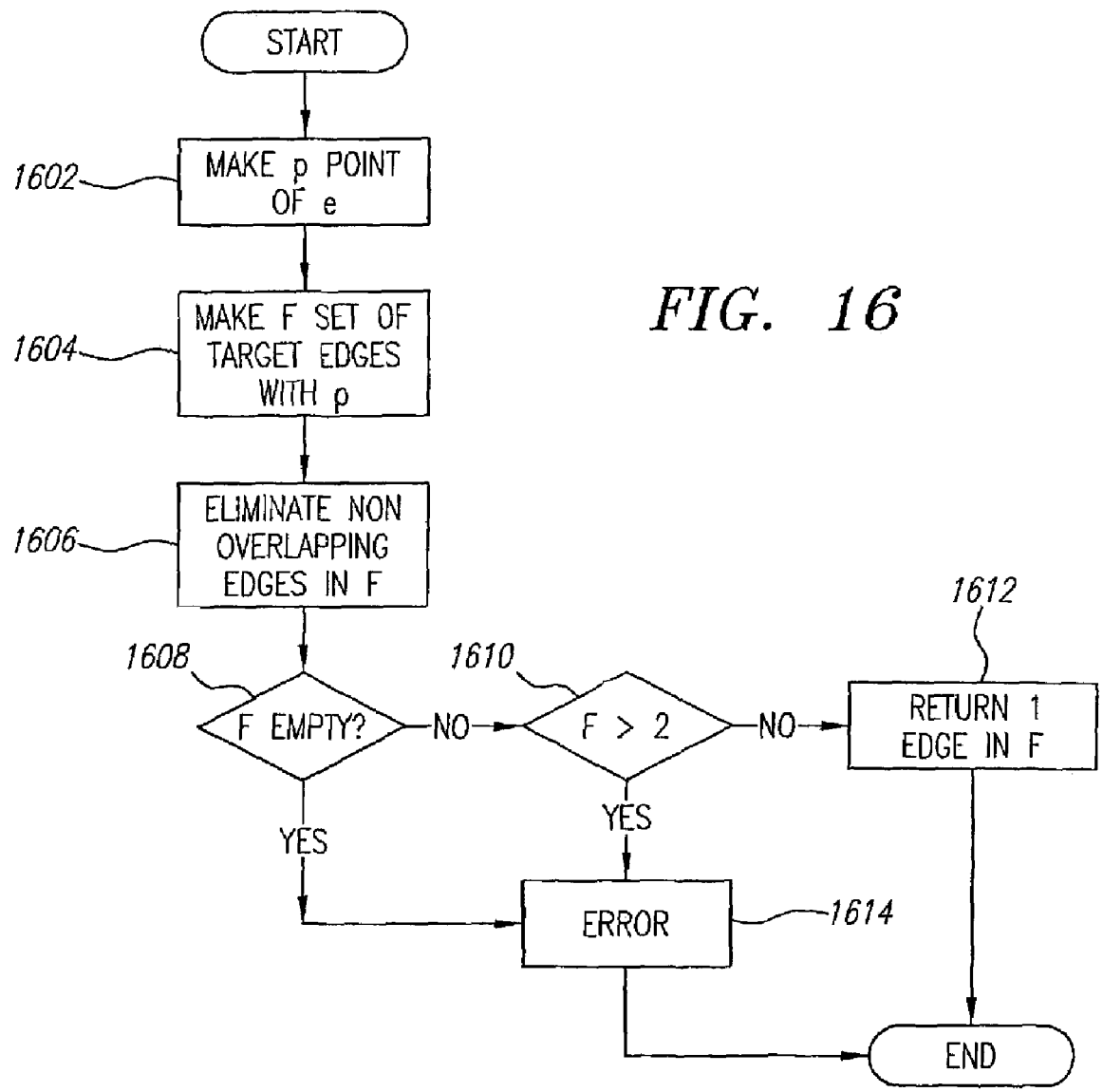

Turning to FIG. 15, it is a flowchart of the edge containment algorithm. In step 1502, a sequence of memory locations representative of a chain of target edges ("C") is flushed. In step 1504, a first target edge is located, preferably from the local scene, and added to the set "C". FIG. 16, which is described below, depicts an embodiment of one algorithm for finding the first target edge. According to another embodiment, the system searches for an edge within a given proximity of a source edge "e".

In step 1506, a test is performed to determine whether a target edge was found and whether the target edge overlaps the source edge "e". If no target edge was found, or the edges do not overlap, then the target edge is removed from candidacy as a matching edge in step 1522. Otherwise, in step 1508 the target edge is extended forward to encompass a next, connected edge. In step 1510, a test is performed to determine whether the newly extended edge is contained by the source edge "e". In step 1512, if the newly extended edge is contained by the source edge "e", then the next, connected edge (extended above) is appended to the target edge and saved in the chain of edges "C". The process repeats until the target edge can be extended forward no longer.

In step 1514, the same process that was described above with reference to steps 1508-1512 is performed, but here, the target edge is extended backward in steps 1514, 1516, and 1518. Moreover, if the extended edge is not contained by the source .edge "e", then processing continues to step 1520.

It is noted that one embodiment of the edge extension process, which is depicted in steps 1508, 1510 and 1512, as well as steps 1514, 1516, and 1518, is described in below with reference to FIG. 17.

In step 1520, the chain of edges "C" is returned as the target edges that matches the source edge.

Finding an Initial Edge

Turning to FIG. 16, it depicts an embodiment of a computer implemented method for finding the initial edge for the edge containment algorithm. In step 1602, a point "p" is selected from the source edge "e". The "p" can be an interior point of "e", or it can be a start-or end-point. In step 1604, a set of edges "F" (e.g., from the local scene) is created that contains the point "p". (It is noted that the set of edges "F" may have already existed in the local scene, but additional members of the set "F" can be added at step 1604—since the creation of the local scene is an incremental process.)

In step 1606, non-overlapping edges in set "F" are removed from set "F". Generally, each edge in set "F" can be iteratively tested against the source edge "e" to verify, that the two edges overlap.

In step 1608, a test is performed to determine whether the set "F" is empty. If the set "F" is empty, then an error has occurred, as is indicated in step 1614. If the set "F" is not empty, then in step 1610 a test is performed to determine whether the set "F" holds more than 2 target edges. If the set "F" holds more than two target edges, then an error has occurred, as is indicated in step 1614. If, however, the set "F" comprises one or two target edges, then one edge is returned for processing in step 1612. (The second edge can be processed if the returned edge does not sufficiently overlap the source edge "e".)

It is noted that step 1614 can involve one or more error correction schemes whereby the particular error correction scheme selected may have an effect on steps 1608, 1610, and/or 1612. Those schemes can include selecting a new point "p", or selecting a second point "p'"—the second point "p'" being close to point "p".

It is noted that FIG. 16 can short circuit the remainder of steps depicted in FIG. 15 if, for instance, a single target edge is identified that completely contains (and is itself completely contained by) the source edge.

Chain Extension Algorithm

Figure 17:
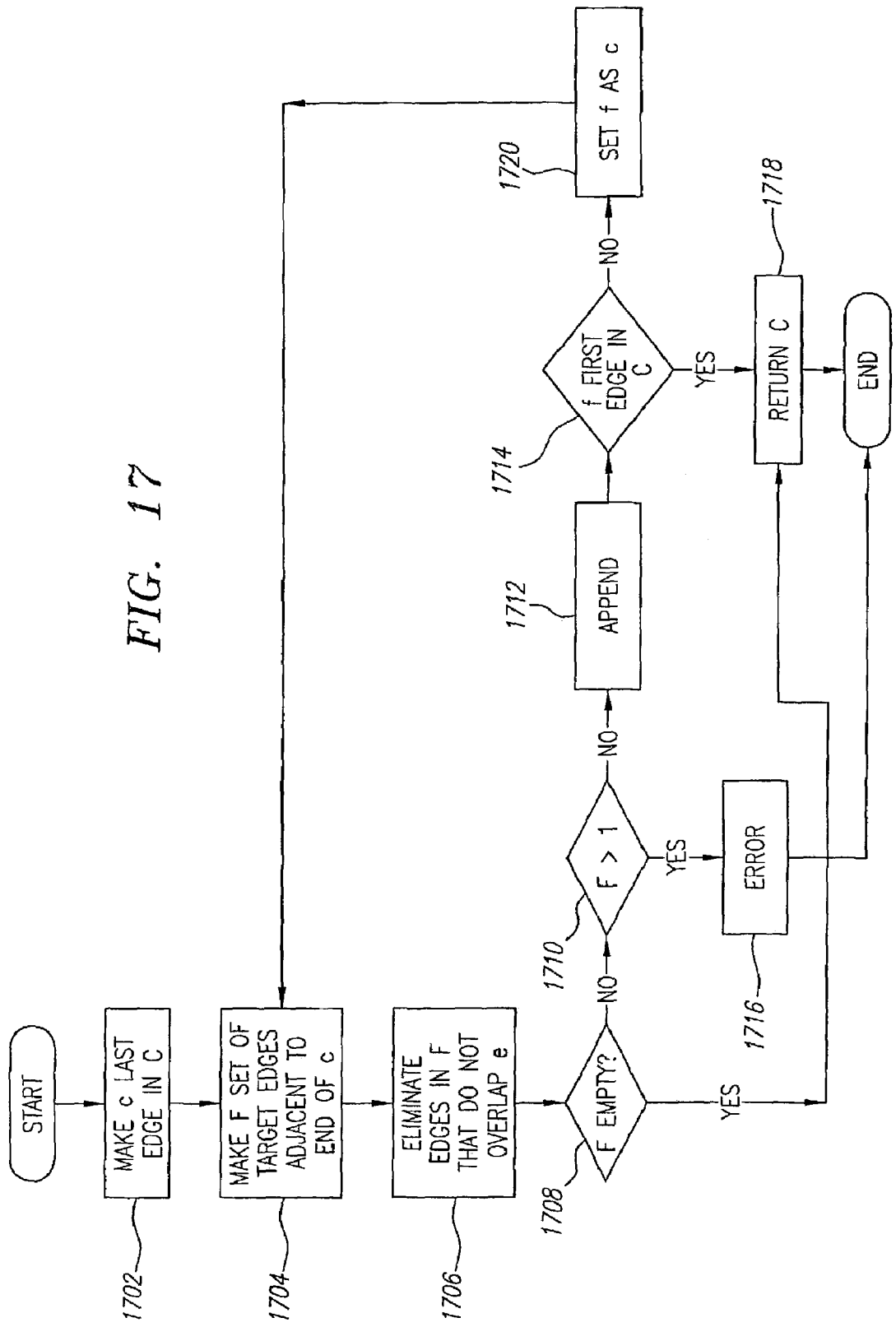

Turning to FIG. 17, it depicts a computer implemented process for extending a chain of edges ("C") representing the source edge "e" according to an embodiment of the invention. The method can be used as a substitute for the process described above with reference to FIG. 15 (steps 1508, 1510, and 1512, or steps 1514, 1516, and 1518), or an adjunct to the process. Moreover, the chain extension algorithm can be applied equally to the process of extending a chain of edges forward or backward.

In step 1702, a member of the set of edges, i.e., the chain of edges "C", is made the last edge in the set. For purposes of explanation, this edge will be referred to as edge "c". In step 1704, a set of target edges adjacent to an end of "c" is identified. This set of adjacent edges will be referred to as set "F". In step 1706, edges in set "F" that do not overlap the source edge "e" are eliminated—in accordance with any of the overlap or containment processes described above.

In step 1708, a test is performed to determine whether the set "F" is empty. When "F" is empty, then the algorithm proceeds to step 1718. If the set "F" is not empty, then in step 1710 a test is performed to determine whether the set "F" includes more than one target edge. If step 1710 results in a response indicative a set of "F" that is greater than one, then an error has occurred and step 1716 is performed. Step 1716 can include returning a failure result, or indicating that a new edge "c" should be selected, or the existing edge "c" should be extended another direction.

However, if there is exactly one edge adjacent to target edge "c", then the one edge (edge "f") is appended to the set "C" in step 1712. In step 1714, edge "f" is tested to determine whether it is the first edge in the set C (i.e., there are no more adjacent edges that are not members of set "C"). If edge "f" is not the first edge in set "C", then in step 1720, edge "f" is set as edge "c", and the process continues to step 1704. Otherwise, in step 1718, set "C" is turned and the process is completed.

Finally, it is noted that it may be desired to repeat the above process in another direction—as the process described above was only with reference to a single direction of extension, as is indicated in the representative embodiment described above with reference to FIG. 15.

Computer Program Product

The techniques described above beginning at CAD DATA EXCHANGE FAILURE, as well the BPF techniques described above said section, are intended to be embodied as one or more sequences of instructions, that is a computer software or computer program product—such as information burned onto a CD-ROM or stored in an electromagnetic memory device, that cause one or more processors or technical systems to perform the methods and transformations described herein. The computer software product can comprise executed object instructions and interpreted program code, or various scripting languages. For instance, the BPF techniques can be embodied in one computer software product, while the API, user emulation, pattern matching, and brep techniques embodied in one or more additional computer software products.

The computer software product can run on a stand-alone computer, for instance a computer system running Microsoft Windows NT (TM), and is an plug-in to an existing computer aided design system, such as ProEngineer 2000i2 (TM). However, in other embodiments, the processes can be separated in functionality. For instance, the extraction or export processes can run on a first computer system, while the creation or import processes can run on a second computer system. Further still, in another embodiment, a middleware system, operating in a server fashion (of a client-server system), can perform the processes either stand-alone (of course, using the APIs on either of two client systems), or as an intermediary between the various processes.

What is claimed is:

1. A computer implemented method for creating a boundary representation on a per feature basis from a parametric design model, comprising:
    loading the parametric design model from a source CAD system, the design model including a plurality of features;
    classifying a first feature from the plurality of features using a knowledge base to determine a type of operation that created the first feature;
    creating a non-parametric boundary representation from the first feature, based on the step of classifying, until the non-parametric boundary representation is inclusive of the first feature;
    storing said non-parametric boundary representation in a memory; and
    repeating the acts of classifying, creating, and storing for each additional features from the plurality of features.

2. The method of claim 1, further comprising:
    creating a parametric representation of the first feature
    associating the parametric representation of the first feature with the non-parametric boundary representation of the first feature; and
    repeating the acts of creating the parametric representation and associating for additional features from the plurality of features.

3. The method of claim 2, wherein the act of creating the parametric representation of the first feature comprises performing an application programming interface technique.

4. The method of claim 2, wherein the act of creating a parametric representation of the first feature comprises a pattern matching technique.

5. The method of claim 2, wherein the act of creating a parametric representation of the first feature comprises a user emulation technique.

6. The method of claim 1, further comprising:
    calling a scene object builder;
    identifying a plurality of elements from the design model with the scene object builder; and
    locating an object builder that corresponds to each identified element;
    wherein acts of creating a parametric representation of the feature and creating the non-parametric boundary representation of the feature are performed by the object builder.

7. The method of claim 1, wherein the act of creating the non-parametric boundary representation includes executing a solid differences algorithm.

8. The method of claim 1, wherein the act of creating the non-parametric boundary representation includes executing a facial differences algorithm.

9. The method of claim 1, wherein the act of creating the non-parametric boundary representation includes executing a boundary differences algorithm.

10. A computer readable data structure for creating non-parameterized boundary representations used for exchanging data between a source computer aided design ("CAD") system and a target CAD system, comprising:
    a parametric representation of a plurality of features in a parametric design model, the features being extracted and interpreted from the source CAD system in a format other than a native format of the feature; and
    a plurality of non-parameterized boundary representation, for each of the plurality of features in the parametric design model, which supplements the parametric representation, at least one of the plurality of non-parameterized boundary representations created with a facial differences algorithm.

11. The computer readable data structure of claim 10, wherein at least one of the plurality of non-parametric boundary representations is created using techniques including a solid differences algorithm.

12. The computer readable data structure of claim 10, wherein at least one of the plurality of non-parametric boundary representations is created using techniques including a boundary differences algorithm.

13. A computer implemented method for importing a parametric CAD model of a solid having a plurality of features from a source CAD system into a target CAD system, comprising:
    exporting a representation of the source CAD model, the exported CAD model including a parametric representation and an individual non-parametric boundary representation for each of the plurality of features;
    importing the parametric representation for each of the plurality of features into the target CAD model in a format other than a native format of the source CAD design model; and
    using the individual non-parametric boundary representation of any feature that fails the step of importing the parametric representation of the same feature; and
    storing the imported representations of the plurality of features in the target CAD system.

14. The computer implemented method of claim 13, wherein said act of importing includes:
    attempting an import action for each parametric representation, and
    attempting a rewrite action for each feature where the import action fails.

15. The computer implemented method of claim 13, further comprising importing the non-parametric boundary representation for each of the plurality of features into the target CAD data model, regardless of whether the import action fails.

16. An apparatus for use with a source computer aided design model and a target computer aided design model, the apparatus comprising:
    a processor; and
    a memory coupled to said processor;
    wherein said memory is configured to contain computer program code adapted to cause the processor to:
        (a) load a parametric design model from a source CAD system, the design model including a plurality of features;

(b) classify a first feature from the plurality of features using a knowledge base to determine a type of operation that created the first feature;
(c) create a non-parametric boundary representation from the first feature, based on the code for classify, until the non-parametric boundary representation is inclusive of the first feature;
(d) store the non-parametric boundary representation for access by a target CAD system; and
repeat (b), and (d) for each additional feature from the plurality of features.

17. The apparatus of claim 16, wherein the memory is further adapted to cause the processor to:
(e) create a parametric representation of the first feature
(f) associate the parametric representation of the first feature with the non-parametric boundary representation of the first feature; and
repeat (e) and (f) for additional features from the plurality of features.

18. The apparatus of claim 17, wherein (e) is further adapted to cause the processor to perform a pattern matching technique.

19. The apparatus of claim 18, wherein (e) is further adapted to cause the processor to perform a user emulation technique.

20. A computer readable data structure for creating non-parameterized boundary representations used for importing and exporting data between a source computer aided design ("CAD") system and a target CAD system, comprising:
a parametric representation of a plurality of features in a parametric design model, the features being extracted and interpreted from the source CAD system in a format other than a native format of the feature; and
a plurality of non-parameterized boundary representation, for each of the plurality of features in the parametric design model, which supplements the parametric representation, at least one of the plurality of non-parameterized boundary representations created with a boundary differences algorithm.

21. The computer readable data structure of claim 20, wherein at least one of the plurality of non-parametric boundary representations is created using techniques including a solid differences algorithm.

22. The computer readable data structure of claim 20, wherein at least one of the plurality of non-parametric boundary representations is created using techniques including a facial differences algorithm.

* * * * *